United States Patent [19]

Matsuno

[11] Patent Number: 5,548,296
[45] Date of Patent: Aug. 20, 1996

[54] METHOD OF AND APPARATUS FOR DETERMINING POSITION OF MOBILE OBJECT AND MOBILE RADIO COMMUNICATION SYSTEM USING THE SAME

[75] Inventor: Keishi Matsuno, Tokyo, Japan

[73] Assignee: Nippon Steel Corporation, Tokyo, Japan

[21] Appl. No.: 216,969

[22] Filed: Mar. 24, 1994

[30] Foreign Application Priority Data

Aug. 19, 1993 [JP] Japan .................................. 5-226525

[51] Int. Cl.$^6$ ........................................................ G01S 3/02
[52] U.S. Cl. ............................................. 342/457; 342/418
[58] Field of Search ...................................... 342/457, 418; 455/33.1

[56] References Cited

U.S. PATENT DOCUMENTS

| | | | |
|---|---|---|---|
| 3,787,862 | 1/1974 | Jacobson | 343/113 DE |
| 4,060,809 | 11/1977 | Baghdady | 343/112 |
| 4,203,113 | 5/1980 | Baghdady | 343/14 |
| 4,350,984 | 9/1982 | Fisher | 343/112 R |
| 4,509,052 | 4/1985 | Cash | 343/418 |

FOREIGN PATENT DOCUMENTS

| | | | |
|---|---|---|---|
| 3113667 | 10/1982 | Germany | G01S 13/74 |
| 63-199527 | of 0000 | Japan . | |
| 5-22183 | of 0000 | Japan . | |
| 5-37438 | of 0000 | Japan . | |
| 58-225741 | of 0000 | Japan . | |

OTHER PUBLICATIONS

Paper B–400, 1993–Spring Meeting of Institute of Electronics, Information and Communication Engineers in Japan.
Paper B–401, 1993–Spring Meeting of Institute of Electronics, Information and Communication Engineers in Japan.

Self–Organized Reuse Partitioning (SORP), A Distributed Dynamic Channel Assignment Method, H. Furukawa and Y. Akaiwa, Technical Report of IEICE, A–P92–116., RCS 92–126, 1993–01, pp. 61–66.

Mobile Radio Conference, Nov. 1991, Valbonne (FR), pp. 51–55, XP391318 M. Mouley et al. "The Pseudo–Synchronization, A Costless Feature To Obtain The Gains Of A Synchronized Cellular Network".

*Primary Examiner*—Thomas H. Tarcza
*Assistant Examiner*—Dao L. Phan
*Attorney, Agent, or Firm*—Pollock, Vande Sande & Priddy

[57] ABSTRACT

A method and an apparatus for determining a position of a movable object comprise transmission of a radio wave of a constant frequency from the mobile object. The transmitted radio wave is received at each of a plurality of spaced positions which are disposed in an area where the mobile object is movable. A frequency of the received radio wave is detected at each of these positions and the position of the mobile object is determined based on position data indicating the spaced positions and a frequency deviation between the frequency of the received radio wave detected at each of the positions and the constant frequency. Further, in a mobile communication system a radio wave of a constant frequency, which is transmitted from the mobile object, is received at each of a plurality of spaced base stations which are disposed in an area where the mobile object is movable. A frequency of the received radio wave is detected at each of the base stations and the positions of the mobile object is determined based on the positions of the spaced base stations and a frequency deviation between the frequency of the received radio wave detected at each of the base stations and the constant frequency.

16 Claims, 13 Drawing Sheets

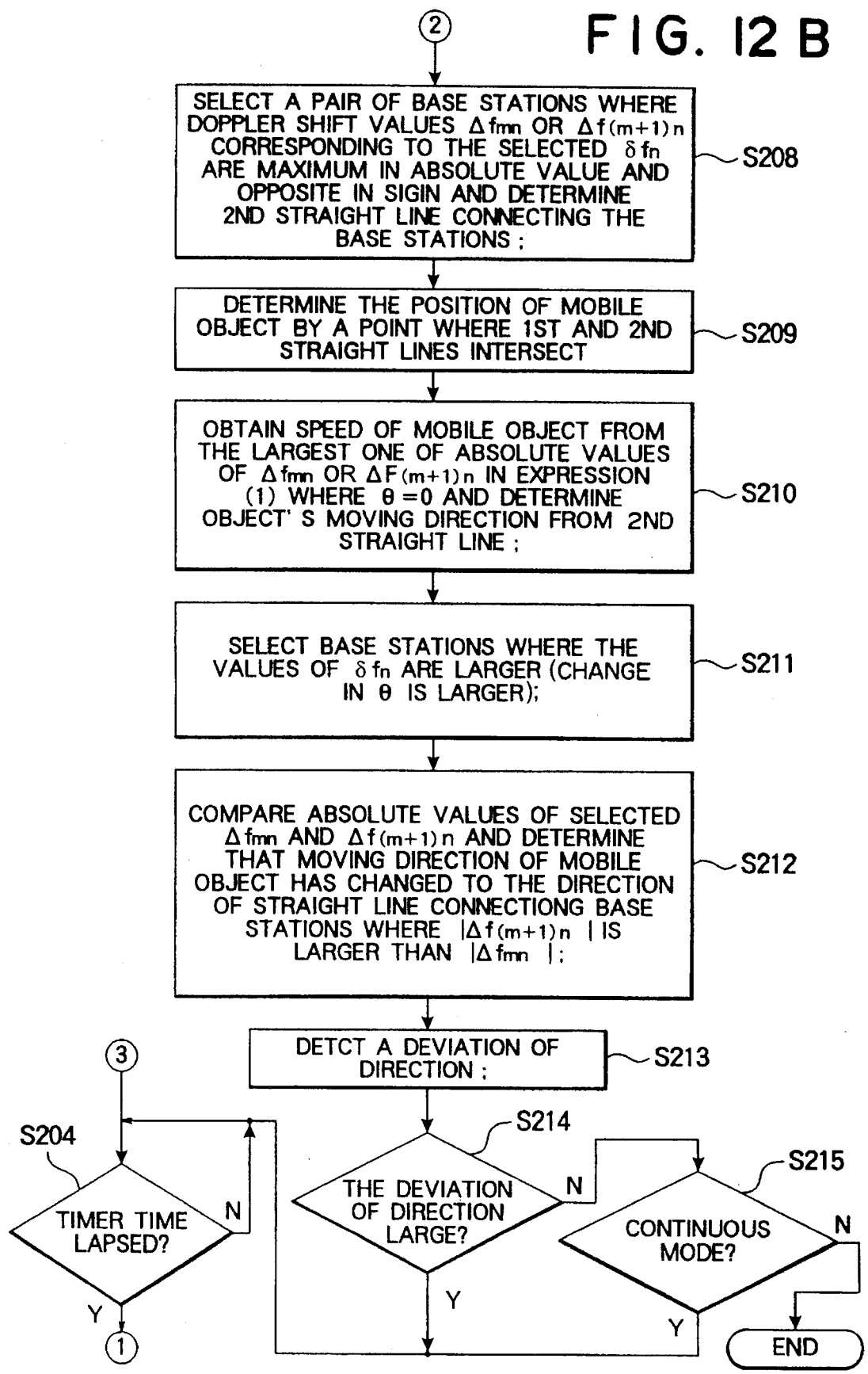

METHOD OF AND APPARATUS FOR DETERMINING POSITION OF MOBILE OBJECT AND MOBILE RADIO COMMUNICATION SYSTEM USING THE SAME

FIELD OF THE INVENTION

The present invention relates to a method and an apparatus for determining a position of a mobile object, and a mobile communication system using the same. More particularly, the present invention relates to a method and an apparatus for detecting a position, moving speed and moving direction of a mobile object with high accuracy and a mobile radio communication system using the method.

BACKGROUND OF THE INVENTION

In a mobile communication system using a TDMA (Time Division Multiple Access) cellular process, a microcell mobile communication system has been examined to use frequencies efficiently. A basic zone arrangement used in the microcell mobile communication system includes the arrangement of a service zone by contiguous microcells each having a radius of about 50 to several hundred meters. Another idea has been proposed to form a service zone by very small cells called picocells which are smaller than the microcell. This system includes contiguous very small cells, each having a radius of about 10–50 meters set in offices, in an underground street or a building where the propagation of radio waves is relatively difficult. Further, an idea of a so-called third generation mobile communication system has been proposed to unify both techniques for very small cells and the macrocells realized in a conventional mobile telephone system.

One of the third generation systems includes a FPLMTS (Future Public Land Mobile Telecommunication Systems), the study of which has started internationally. The FPLMTS uses a variety of cell structures such as macrocells, microcells, and picocells arranged in a multilayered (or complex-cellular) structure in a service zone. Thus, high degree radio channel mobile control is indispensable which includes a control of zone switching between the respective cells, and allocation and switching of frequency bands among the respective cells. As the size of the cells becomes very small, problems occur which include an increase of the positional variation of the level of the receiving signal, an increase of the frequency in channel switching (frequency or time slot) during communication, and an increase of the installation cost of the base stations. Further problem is to deal with traffic concentration or jam and provide flexible service for mobile objects moving at very high or very low speeds.

Conventionally, in order to solve those problems, a study has been made of the decentralized autonomous control technique where each base station autonomously determines and uses an available channel, and the dynamic channel allocation which dynamically uses a frequency in accordance with time-dependent and positional variation of the traffic. In particular, in the switching control of a radio channel under communication ("handover"), studies have been made of a system for synchronizing various timing operations between the base stations, high-speed switching frequency synthesizer, etc., in order to cope with an increase in the switching frequency. (See H. Furukawa and Y. Akaiwa "Self-Organized Reuse Partitioning (SORP), A Distributed Dynamic Channel Assignment Method" Technical Report of IEICE. A.-P92-116, RCS92-126 1993-01, pp. 61–66) In those proposed measures, the detection of the moving speed and moving direction of a mobile object is especially important. However, no practical detecting means have been proposed.

A conventional method of detecting the moving speed of a mobile object in a mobile object communication system includes presumption of a Doppler frequency, using indirect measurement. For example, as described in papers B-400 and B-401 published at the 1993-Spring Meeting of Institute of Electronics, Information and Communication Engineers of Japan, the speed of a mobile object is presumed on the basis of the number of times of intersection of power level in an envelope under Rayleigh fading and the measured values of the frequency of switching branches in the reception diversity. This is based on the principle that the number of times of intersection of the power level and the frequency of switching the branches are found statistically to be proportional to the Doppler frequency. Since the results of those measurements and presumptions are indirectly obtained, however, they involve large errors and are not sufficiently satisfactory. In addition, those are applied solely to the detection of the speed of movement of a mobile object.

Another application of the Doppler effect to the mobile communication is intended to compensate for an undesirable frequency shift of the communication wave due to the movement of the mobile object to ensure stabilized communication, as disclosed in Japanese Patents JP-A-58-225741, 63-199527, 5-22183 and 5-37438. Other applications are VICSs (Vehicle Information and Communication Systems) where the communication system receives information on the position and speed, etc., of a car, GPS (Global Positioning System) which use satellites as a global position measuring system, which are, however, large-scaled and complicated.

A location detection system for a mobile terminal which is considered an application of a so-called enterprise cordless telephone locates the mobile terminal on the basis of the intensity of radio wave which has been transmitted through not only the same floor of a building but also a floor or ceiling of the building. Thus, in order to presume a fixed radio base station in the vicinity of which the mobile terminal under detection exists, various devices such as provision of additional devices on passageways and stairs are required in each of the service zones, as described in a paper entitled "A Study of Location Detection System" by Ito, RCS Research Association, Institute of Electronics, Information and Communication Engineers of Japan, RCS 90-48.

The basic concept of the above conventional counter method is to flexibly handle the move of a mobile object or the generation of a new call on the network side or user side. However, this method has an essential weak point. In order to appropriately handle the move of the mobile object, it is indispensable to detect the position of the object and its moving speed and direction substantially simultaneously like in the automatic control of a robot. Nevertheless, this conventional method only presumes the position of the mobile object by causing each of the base stations around the mobile object to monitor and measure the intensity of radio wave on the basis of communication between the base station and the mobile object.

Since the intensity of the radio wave changes depending on place, time and space, it is difficult to improve the accuracy of detection even if a statistical technique is used. This implies that no appropriate detection method has been proposed so far. Thus, there is naturally a limitation in the accuracy of detection, by measurements including flexible network control which has been considered as a method of solving this problem. The Doppler effect, mentioned above, is solely applied to indirect detection of frequency shift and detection of the moving speed of the mobile object. Simultaneous detection of the position of the mobile object and its moving speed and direction and a mobile communication system using the simultaneous detection have not been proposed.

SUMMARY OF THE INVENTION

It is an object of the present invention to provide a method and an apparatus for simultaneously detecting the position of a mobile object and its moving speed and direction with high accuracy, which are suitable for use with a mobile communication system and applicable to car navigation and control of the travel of a robot in a factory.

It is another object of the present invention to provide a mobile communication system having the function of simultaneously detecting the position of a mobile object and its moving speed and direction simultaneously with high accuracy.

According to the present invention, a method of determining a position of a mobile object comprises the steps of transmitting a radio wave of a constant frequency from the mobile object; receiving the radio wave transmitted from the mobile object and detecting a deviation of a frequency of the received radio wave from the constant frequency at each of a plurality of spaced positions disposed in an area where the mobile object is movable; and determining a position of the mobile object on the basis of position data indicating the plurality of spaced positions and a deviation of a frequency of the received radio wave from the constant frequency detected at each of the spaced positions.

According to the present invention, an apparatus for determining a position of a mobile object comprises means for receiving a radio wave of a constant frequency transmitted from the mobile object and detecting a deviation of a frequency of the received radio wave from the constant frequency at each of a plurality of spaced positions disposed in an area where the mobile object is movable; and means for determining a position of the mobile object on the basis of position data indicating the plurality of spaced positions and the deviation of the frequency of the received radio wave from the constant frequency detected at each of the spaced positions.

According to the present invention, a mobile radio communication system comprises a plurality of base stations provided at a plurality of spaced positions disposed in an area where the mobile object is movable for making radio communication with the mobile object; means provided to each of the base stations for receiving a radio wave of a constant frequency transmitted from the mobile object and detecting a deviation of a frequency; of the received radio wave from the constant frequency and means for determining a position of the mobile object on the basis of positional data indicating the spaced positions and the deviation of the frequency of the received radio wave from the constant frequency detected by each of the base stations.

The radio wave transmitted from the mobile object is received by each of the distributed base stations. The frequency of the received wave by each base station includes a Doppler shift component derived from the movement of the mobile object. The Doppler shift component detected by each of the base stations changes depending on not only the moving speed of the mobile object but also the relationship between the moving direction of the mobile object and the position of the base station. Since the moving speed of the mobile object relative to the base station which is positioned along the passageway of movement of the mobile object is large, that base station detects a large Doppler shift component. Among the base stations which detect large Doppler shift component, those base stations to which the mobile object is approaching detect an up-shift component indicating the frequency shifts upward or increase, whereas those base stations from which the mobile object is moving away detect a down-shift component indicating the frequency shifts downward or decrease.

In contrast, since the moving speed of the mobile object relative to the base station which is positioned in a direction perpendicular to the direction of movement of the mobile object is small, that base station detects a smaller Doppler shift component. The results of the detection including the Doppler shift components detected by the respective base stations are reported to the mobile object detection means provided preferably to a mobile local switch through radio or cable transmission passages. The mobile object detection means detects the position of the mobile object and, as required, the moving direction and speed of the mobile object from the respective results of detection of the base stations and the position data indicating the known positions or the spatial distribution of the respective Doppler shift components, which are detected by the base stations on the presumption that the Doppler shift components are included in results of detection reported by the base stations.

For example, the mobile object detection means detects the direction of movement of the mobile object by setting a first line segment which passes through at least one of the base stations which has reported the result of the detection including substantially a maximum up-shift component or the vicinity of the at least one base station and at least one of the base stations which has reported the result of the detection including substantially a maximum down shift component or the vicinity of the last-mentioned at least one base station. Furthermore, the mobile object detection means detects as the position of the mobile object a point where a second line segment, which passes through at least one of the base stations which has reported the result of the detection including substantially a zero or minimum shift component or the vicinity of the just-mentioned at least one base station, intersects with the first line segment substantially at a right angle.

The frequency stability of a signal generated by each base station becomes an issue in the detection of the frequency of the received radio wave including the Doppler shift component. Generally, in the mobile object communication system, the frequency stability is set as a technical standard to be less than $3 \times 10^{-6}$ in absolute accuracy in a PHP (Personal Handy Phone), the practical use of which is expected. This value is an absolute stability which should not be exceeded in any case. The frequency band used in the PHP is 1.9 GHz, so that the frequency stability is ±5.7 KHz from the calculation of $1.9 \times 10^{-9} \times 3 \times 10^{-6}$, from which it is required that the sum of the frequency errors of all local oscillators used in frequency converters for a so-called up or down conversion in the transmitter and receiver is less than ±5.7 KHz.

Usually, a crystal oscillator is used as the local oscillator. Thus, the frequency stability of the local oscillator actually is several times higher than the above value. In particular, the frequency stability for a short time of several to several tens of seconds except for an instant just after the power supply is turned on is very high, for example, of $10^{-8}$–$10^{-10}$ due to the recent technical progress. Thus, the frequency deviation can be measured directly with high accuracy from the intermediate frequency IF, by using a local oscillator of high frequency stability.

As described above, in view of a short-time frequency stability, the position of a mobile object is detected with relatively high accuracy. In order to improve the accuracy of detection, the calibration of frequency is carried out among the base stations as in the mobile communication system in one embodiment of the present invention. More specifically, according to the system of this embodiment, any particular base station transmits a standard signal of a predetermined frequency to the other base stations around the particular base station prior to detection of the frequency of the received radio wave including the Doppler shift component. Each of the base stations including the particular base station detects and stores the frequency of the standard signal transmitted from the particular base station, and corrects or calibrates the result of detection of the Doppler shift component by the stored frequency.

BRIEF DESCRIPTION OF THE DRAWINGS

FIGS. 12A and 12B are a flowchart indicating the steps of the method according to a third embodiment of the present invention.

DESCRIPTION OF THE PREFERRED EMBODIMENTS

A first embodiment of a method of determining the position of a mobile object according to the present invention applied to a mobile communication system will be described with reference to the drawings.

Figure 6:
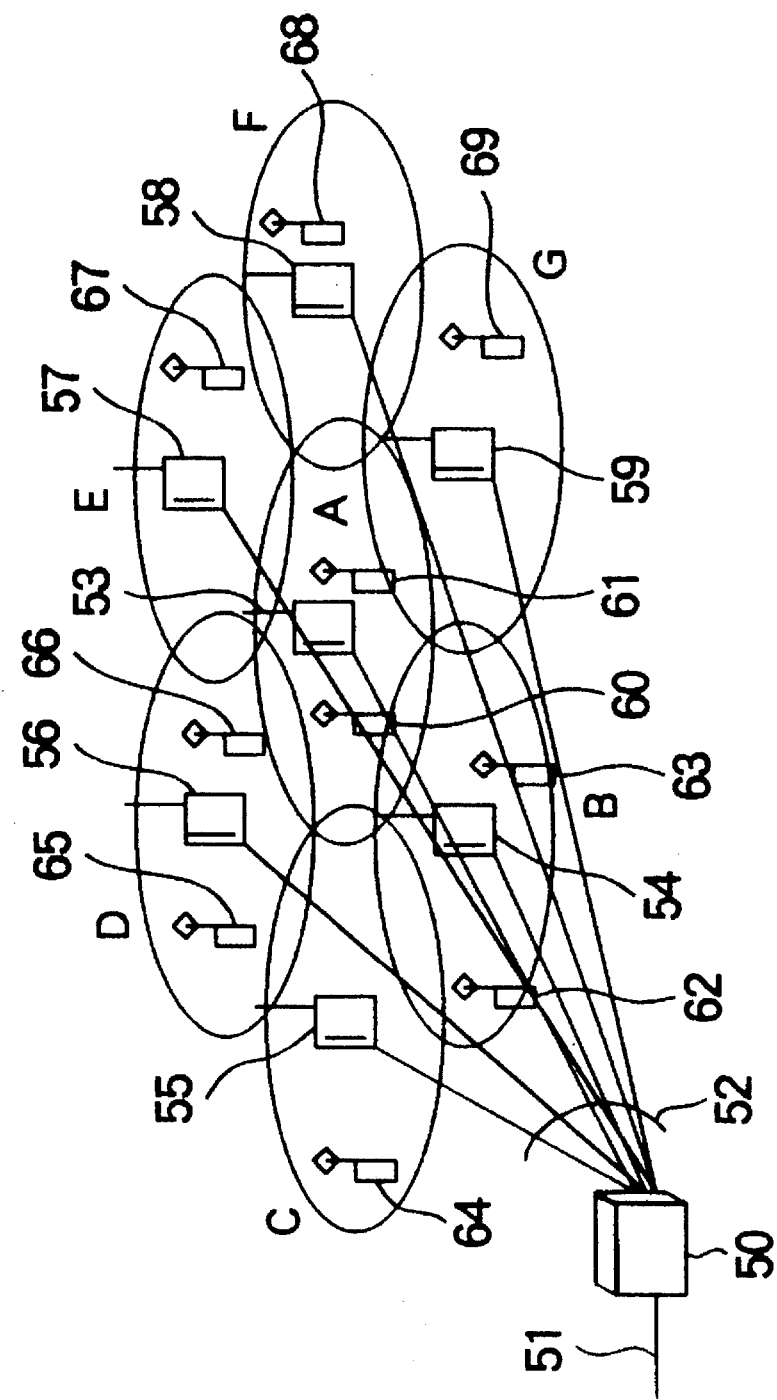
FIG. 6 is a schematic structure of a microcell mobile communication system as a typical example the mobile communication system according to one embodiment of the present invention.

FIG. 6 shows an illustrative structure of a microcell mobile communication system having the function of detecting the position of the mobile object and its moving speed and direction according to one embodiment of the present invention. Briefly, this system is provided with a mobile local switch (MLS) 50; a line 51 connecting it to a fixed telephone network; microcell service zones A–G; base stations (BSs) 53–59 each constituting a microcell; and mobile stations (MSs) 60–69. The base stations 53–59 are connected through corresponding wires 52 to the mobile local switch 50, which sets/releases a radio channel as a radio access node and controls various subscriber's functions such as handoff.

Figure 5:
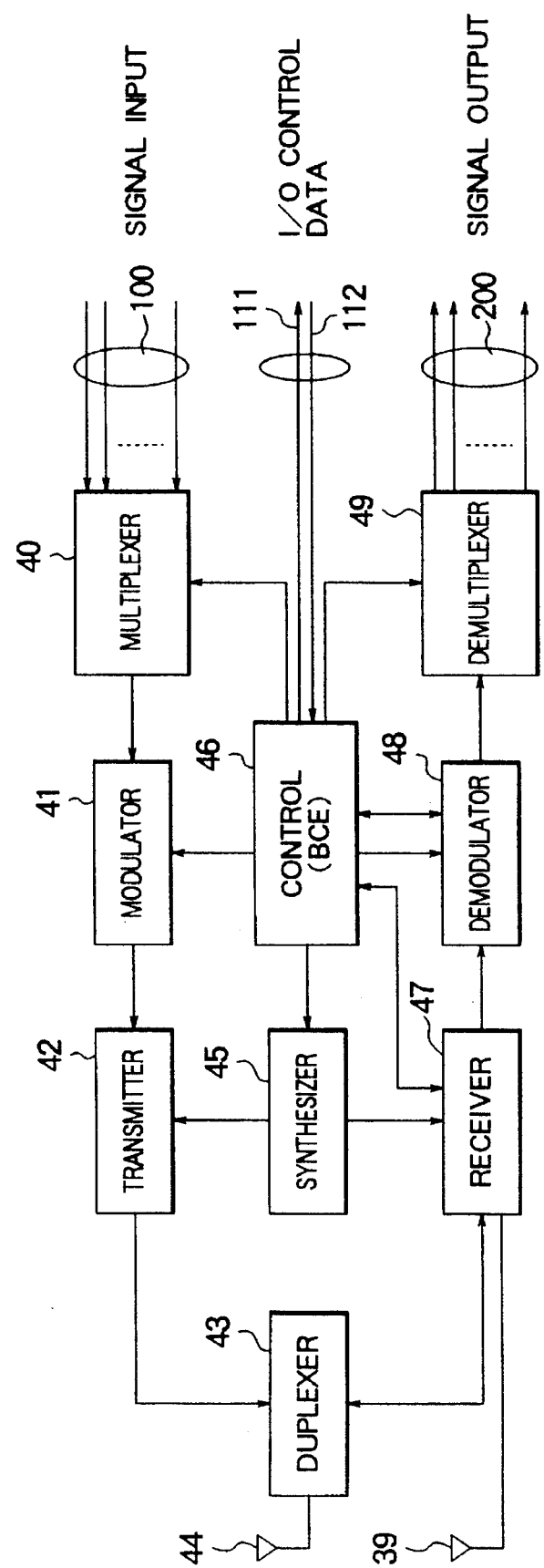
FIG. 5 is a block diagram indicating the circuit configuration of a main portion of each of the base stations which constitute a part of the mobile communication system according to one embodiment of the present invention.

FIG. 5 is a block diagram indicating a structure of each of the base stations 53–59 of FIG. 6. In the transmission section, the input signals 100 received through a plurality of wire channels for every predetermined time interval are multiplexed by a time division multiplexer 40 in a time-division mode. The input signals are allotted to frames to be transmitted through a predetermined channel and each frame including control data added thereto is compressed so that the frames can be transmitted in a predetermined short time interval allotted to that channel. The multiplexed signal is modulated by a modulator 41 and transmitted through a transmission unit 42 and an antenna duplexer 43 from an antenna 44.

In the receiving section, the control signal received by an antenna 39 and a communication signal received by the antenna 44 and having passed through the antenna duplexer 43 are fed through a receiving unit 47 to a demodulator 48. The demodulator 48 includes an equalizer having the function of eliminating possible distortions which the received signals have suffered in the transmission path and demodulates the communication signal. The demodulated signal is fed to a signal demultiplexer 49 which demultiplexes the signal in an operation reverse to that of the multiplexer 40. Base station control equipment (BSE) 46 controls the timing of the framing operation and transmission/reception, and setting/switching of a frequency synthesizer 45 including a stable frequency oscillator. A part of so-called CODEC circuit is not shown which includes A/D and D/A converters which receive the input signals 100, output signals 200 from the demultiplexer 49 and input/output control data 111, 112.

Figure 3:
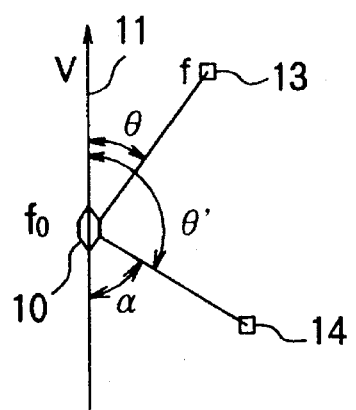
FIG. 3 illustrates the principle of detecting the position of the mobile object and its moving direction and speed by each base station from the frequency of a radio wave which the base station has received from the mobile object in a mobile communication system according to one embodiment of the present invention.

FIG. 3 illustrates the principle of detection of a Doppler shift frequency used for detecting the position of a mobile object and its moving speed and direction. Assume that the mobile object 10 which may be a car transmits radio wave at a frequency $f_0$ (wavelength $\lambda_0$) while traveling at a speed v in the direction of an arrow 11. The frequency f of the radio wave received by each of the base stations 13, 14 includes a frequency shift on the basis of the principle of the Doppler effect. The frequency shift component changes in proportion to the speed of the mobile object relative to the base station. A base station which the mobile object is approaching encounters an up shift of the frequency in which the frequency of the received wave increases, while a base station which the mobile object is leaving encounters a down shift of the frequency in which the frequency of the received wave decreases. Now let the propagation speed of the radio wave be C $(=f_0\lambda_0)$; let the maximum up shift value of the frequency of the radio wave occurring at a base station positioned in the direction of movement (straight forward) of the mobile object be $\Delta F=(v/C)f_0=v/\lambda_0$ (>0); and let the angle between the direction of movement of the mobile object 10 and a line connecting the base station 13 and that mobile object be θ. The approaching speed of the mobile object 10 relative to that base station is then regarded as v cos θ.

Thus, the Doppler shift component Δf occurring in the radio wave received at the base station 13 is given by $$\begin{aligned}\Delta f &= (v/\lambda_0)\cos\theta \\ &= \Delta F\cos\theta\end{aligned}$$

Similarly, the Doppler shift component Δf' occurring in the radio wave received at the base station 14 is given by $$\begin{aligned}\Delta f' &= (v/\lambda_0)\cos\theta' \\ &= -(v/\lambda_0)\cos\alpha \\ &= -\Delta F\cos\alpha\end{aligned}$$

The speed v of the mobile object detected by a base station is calculated from the Doppler shift component Δf and θ or the Doppler shift component Δf' and θ' as follows:

$$v = \Delta F \lambda_0 \cos\theta \qquad (1)$$

Figure 4:
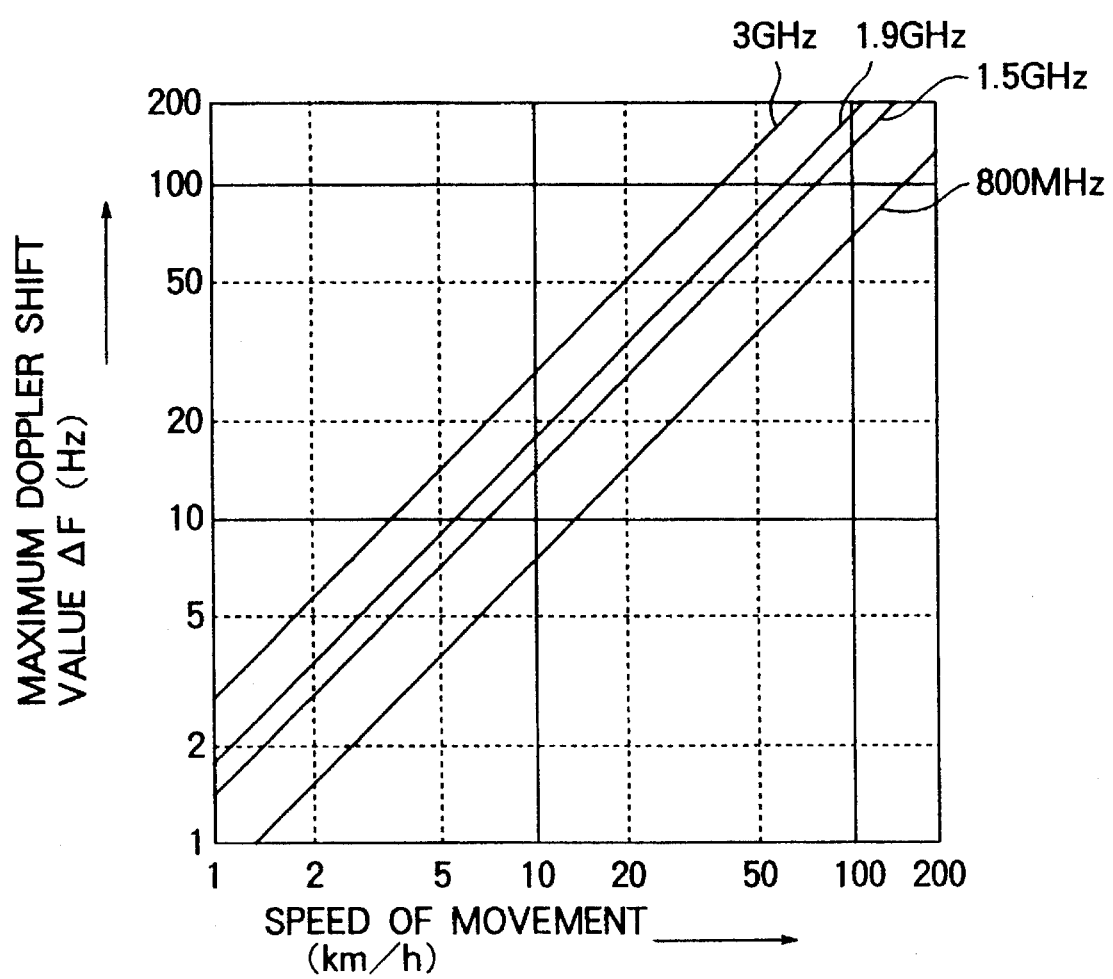
FIG. 4 shows the relationship between the moving speed of a mobile object and a maximum Doppler shift component observed by a base station.

FIG. 4 shows the relationship between a maximum frequency shift value ΔF and the speed v of the mobile object obtained from expression (1) for each of 1.9 GHz ($\lambda_0 \approx 15.79$ cm) used in a PHP and other near frequencies higher and lower than 1.9 GHz when θ=0 in expression (1). It is seen from the relationships that the walking speed of a human being ≈4 km/h, car's velocities≈10–30 km/h and 30–100 km, and further higher velocities are measurable. In order to detect the frequency shift value accurately, the stability of the method used for detecting such shift value and that of the frequency of a signal generated in each base station to be used for that detection are ensured.

The stability of a local oscillator of each base station used in the mobile communication system of the present embodiment will be described next. Generally, the local oscillator is used to convert the received frequency to an intermediate frequency. The received radio wave and the output from the local oscillator are mixed to output the intermediate frequency as the difference in frequency between the radio wave and the oscillator output. Thus, the frequency stability of the local oscillator of each base station directly influences the accuracy of detection of the Doppler shift component. The radio channel control of the current mobile communication system is based on so-called multi-channel access. A frequency synthesizer has been developed and put in practical use as means for easily realizing the multi-channel access. The technical development of the frequency synthesizer is now advancing toward an increasing speed switching operation in accordance with a demand for handoff, etc., as mentioned above.

When the high-speed switching frequency synthesizer is considered from a standpoint of frequency stability, however, it will be seen that the purpose of technical development of the frequency synthesizer is to reduce the time taken for channel switching. For example, it is said that it takes 0.5–2.0 ms from the setting of a command to switch a channel to the settling of the output frequency of the frequency synthesizer within a range of frequency error of ±300 Hz–±1 KHz. A finally obtained frequency stability and a time taken for obtaining that stability are changeable. Since the factors of fluctuation are considered to exist in the stability and phase resolution of a phase comparator which is one of the constituents of the frequency synthesizer and the deviation of the control voltage used in its voltage controlled oscillator (VCO), a mere crystal oscillator is considered to be better in whole frequency stability than the VCO. Under such situation, the recent technical advancement has achieved $10^{-8}$–$10^{-10}$ of frequency stability for a short time of several to several tens of seconds, as mentioned above.

Figure 2:
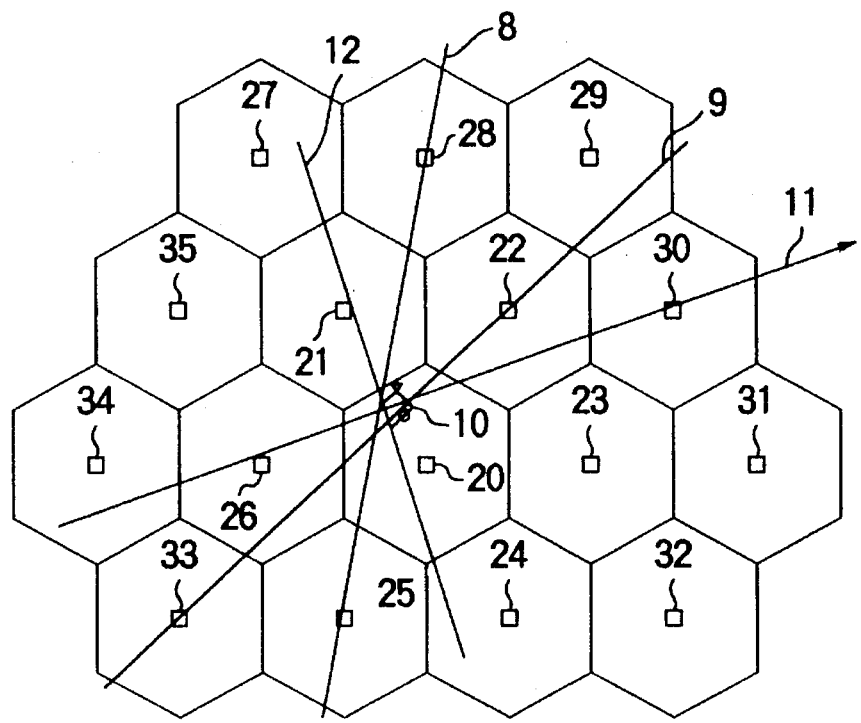
FIG. 2 is a view indicating the relationship between the locations of the respective service zones of the base stations and a method of detecting the position and moving direction and speed of a mobile object in a mobile communication system according to one embodiment of the present invention.

Now, a detecting process in the present embodiment will be described which takes into consideration the features of very small cells and the realization of a short-time frequency stability in a microcell mobile communication system. FIG. 2 is a systemic view for explaining the function of detecting the position of a mobile object and its speed and direction of movement according to the present invention. In FIG. 2, base stations 20–35 positioned at substantially the centers of hexagonal cells are also detecting points for the Doppler shift frequency occurring as the mobile object 10 moves. The straight lines in FIG. 2 include a first straight line 11 coincident with the direction of movement of the object 10 shown by an arrow and a second straight line 12 intersecting with the first straight line 11 almost at a right angle.

A first embodiment of a method of detecting the position of the mobile object and its speed and direction of movement to be executed by a base station control equipment (BCE) 46 of FIG. 5 and a mobile local switch (MLS) 50 of FIG. 6 will be described with reference to a flowchart of FIG. 1. Now assume that the mobile local switch 50 has determined that there is a need for detecting the position of the object $MS_0$ and its speed and direction of movement when the mobile local switch 50 has received a request for execution of a handoff through the base station control equipment (BCE) 46 of a base station $BS_0$ provided in a service zone where the mobile object $MS_0$ is located and under communication. In that case, the mobile local switch 50 starts the detection of the mobile object in accordance with the flowchart of FIG. 1.

Figure 1:
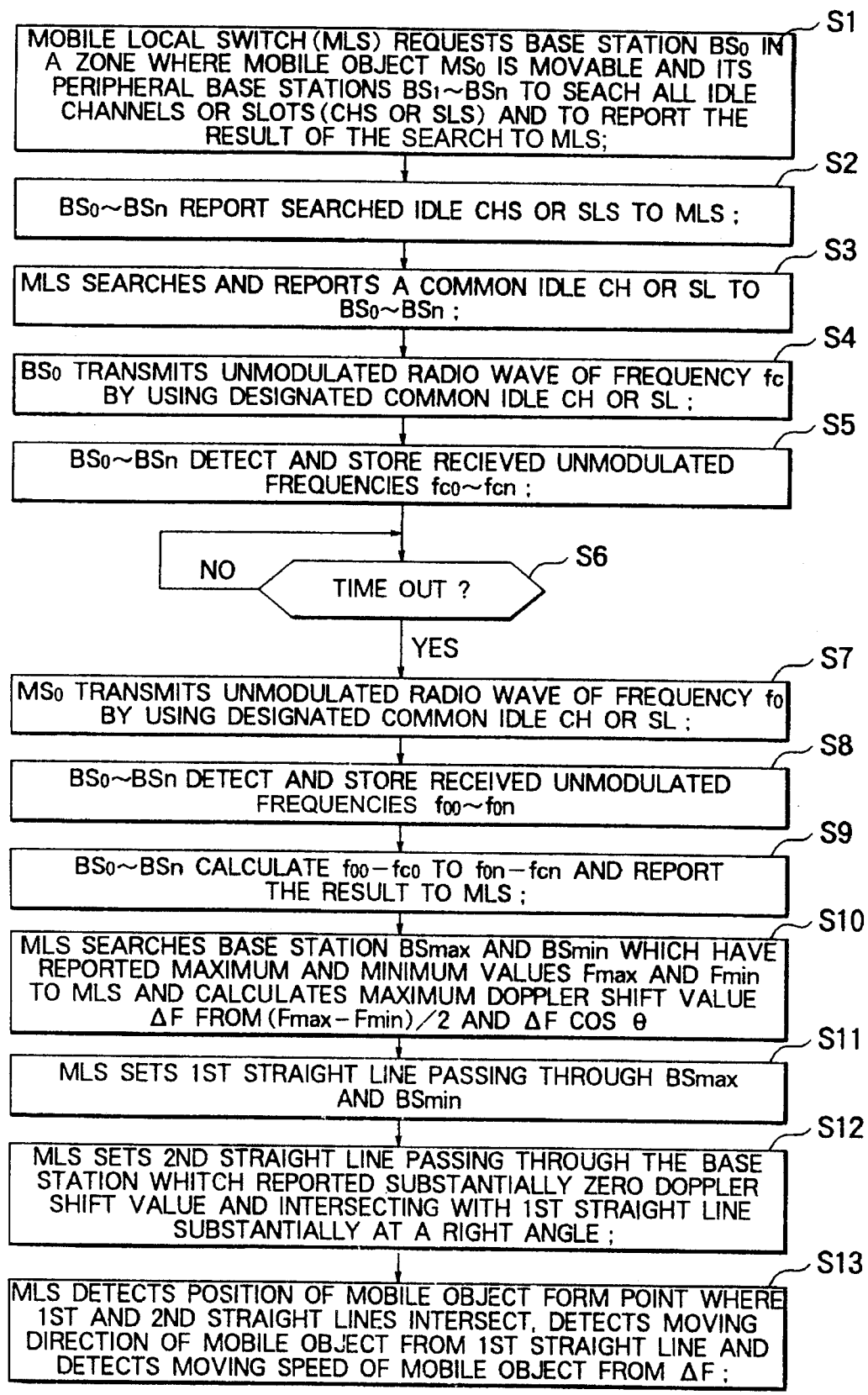
FIG. 1 is a flowchart indicating a method of determining the position of a mobile object according to a first embodiment of the present invention.

The mobile object $MS_0$, base station $BS_0$ in the service zone where the mobile object is currently located, the base stations $BS_1$–$BS_6$ around the base stations $BS_0$ of FIG. 1 correspond to the mobile object 10, base station 20, and the peripheral base stations 21–26, respectively, of FIG. 2. When the detection of the mobile object starts, the mobile local switch 50 requires the base stations $BS_0$–$BS_n$ (in this embodiment, n=6) to search all idle channels or time slots and to report the result of the search to the switch 50 (step S1).

The base station $BS_0$ and the peripheral base stations $BS_1$–$BS_n$ check whether the respective upward channels or time slots (transmitter; mobile object $MS_0$, Receiver; base stations $BS_0$–$BS_n$) from the mobile object $MS_0$ toward the respective base stations $BS_0$–$BS_n$ are idle or not, and report the result of the checking immediately to the mobile local switch 50 (step S2). In response to this report, the switch 50 searches idle channels or time slots common to the base stations $BS_0$–$BS_n$, selects any one of them and reports it to the respective base stations $BS_0$–$BS_n$ (step S3). In response to this report, the respective base stations $BS_0$–$BS_n$ are immediately put in a standby state with the designated common idle channel or time slot.

The base station $BS_0$ transmits a non-modulated radio wave of a stable frequency $f_c$, that is, a radio wave which is not subjected to modulation involving intentional change of frequency or phase, simultaneously toward the respective peripheral base stations $BS_1$–$BS_n$, using the designated idle channel or slot (step S4). In this case, the TDMA system allows the base station to use another time slot for continuing communication with another mobile object without interrupting possible telephonic communication made so far. The base station $BS_0$ is constructed to perform a plurality of receiving operations, and its base station control equipment (BCE) 46 provides such control that the base station $BS_0$ can receive the non-modulated radio wave of a frequency $f_c$ which the base station $BS_0$ has transmitted. The frequency $f_c$ of the non-modulated radio wave may generally be the same as the radio frequency (hereinafter referred to as $f_0$) which the mobile object $MS_0$ uses at present in its communication or another frequency. It is to be noted that the non-modulated radio wave is required to be transmitted from a stationary station.

The respective base stations $BS_0$–$BS_n$ receive the non-modulated radio wave of a frequency $f_c$ transmitted from the base station $BS_0$, and store the detected frequency values $f_{c0}$–$f_{cn}$ in their corresponding memories (step S5). Referring to FIG. 5, the output from the frequency synthesizer 45 including a stable oscillator composed of a synthesizer system or a mere crystal oscillator is fed as a local oscillation signal to the receiver circuit 47, where the received non-modulated radio wave $f_c$ and the local oscillation signal are mixed in a mixer (not shown) of the receiver circuit 47 into a signal of intermediate frequency which is a difference between the frequency of the received non-modulated radio wave $f_c$ and that of the local oscillation signal. The intermediate frequency signal is then fed to the base station control equipment 46 where it is detected by a frequency counter (not shown) of the base station control equipment 46. In this case, it is apparent that a so-called direct conversion system which directly converts the frequency of the received radio wave into the intermediate frequency by using a stable crystal oscillator or a multi-stage intermediate frequency conversion device may be used to produce a target intermediate frequency signal.

The respective base stations $BS_0$–$BS_n$ receive the non-modulated radio waves of a frequency $f_c$ transmitted from the base station $BS_0$, and store the detected frequency values $f_{c0}$–$f_{cn}$ in their corresponding memories thereof, as mentioned above. A general technique to improve the accuracy of the detected result includes, for example, a statistical processing method in which the non-modulated wave is repeatedly detected and the frequency values are averaged and a process of sending several successive time slots in the form of a burst to facilitate the detection of the frequency values. It is also clear that a common idle channel or time slot is not necessarily required to be used in order to detect the frequency of the non-modulated radio wave so long as no interference occurs.

The base station control equipment 46 of each of the base stations $BS_0$–$BS_n$ completes the detection of the frequency $f_c$ of the received radio waves and storage of the result of the detection within a predetermined interval of time after it has received a report on the idle channel or time slot (step S6). Usually, the interval of time is less than several hundred milliseconds. After that predetermined interval of time, the mobile object $MS_0$ which is now under communication and is to be measured transmits a non-modulated radio wave of a frequency $f_0$, using the common idle channel or time slot selected and designated at step S3, toward the respective base stations $BS_0$–$BS_n$ (step S7). The respective base stations $BS_0$–$BS_n$ detect the frequency of the received non-modulated radio wave and store the respective results of the detection, or detected frequencies $f_{00}$–$f_{0n}$ in their corresponding memories (step S8).

The base station control equipment 46 of each of the base stations $BS_0$–$BS_n$ performs the following subtraction, using the two stored, values i.e, $f_{cn}$ and $f_{0n}$. By this substraction, the following data will be obtained in the respective base stations $BS_0$–$BS_n$:

$$(f_{00}-f_{c0}), (f_{01}-f_{c1}), \ldots, (f_{0n}-f_{cn})$$

This subtraction eliminates frequency fluctuations in the local oscillator of each of the base stations to improve the accuracy of detection of the frequency including the Doppler shift component.

The reason for this is as follows. Since, generally, the oscillation frequencies of the local oscillators of the base stations $BS_0$–$BS_n$ fluctuate with time, they are not the same. Ideally, it is desired that the oscillation frequencies of the local oscillators of the respective base stations $BS_0$–$BS_n$ are the same. Let the same ideal frequency be $f_1$ and let the respective deviations of the oscillation frequencies in the base stations from the ideal frequency $f_1$ be $\Delta f_{10}, \Delta f_{11}, \ldots, \Delta f_{1n}$. The respective oscillation frequencies of the local oscillators of the base stations $BS_0$–$BS_n$ are then represented by $$(f_1+\Delta f_{10}), (f_1+\Delta f_{11}), \ldots, (f_1+\Delta f_{1n})$$

In this case, the frequencies $f_{c0}, f_{c1}, \ldots, f_{cn}$ of the received non-modulated radio wave detected at step S5 are represented as follows:

$$f_{c0} = f_c - (f_1 + \Delta f_{10})$$
$$f_{c1} = f_c - (f_1 + \Delta f_{11})$$
$$\vdots$$
$$f_{cn} = f_c - (f_1 + \Delta f_{1n})$$

The frequencies $f_{00}, f_{01}, \ldots, f_{0n}$ of the received non-modulated radio wave detected at step S8 are represented as follows:

$$f_{00} = f_0 - (f_1 + \Delta f_{10}) + \Delta F \cos \theta_0$$
$$f_{01} = f_0 - (f_1 + \Delta f_{11}) + \Delta F \cos \theta_1$$
$$\vdots$$
$$f_{0n} = f_0 - (f_1 + \Delta f_{1n}) + \Delta F \cos \theta_n$$

Assume here that the respective short-time stabilities of the oscillation frequencies of the local oscillators of the base stations are so high that the value of $\Delta f_{10}$–$\Delta f_{1n}$ can be regarded as unchanged between the time of detection of $f_{c0}$–$f_{cn}$ and the time of detection of $f_{00}$–$f_{0n}$.

Thus, making the above calculations $$(f_{00} - f_{c0}) = f_0 - f_c + \Delta F \cos \theta_0$$
$$(f_{01} - f_{c1}) = f_0 - f_c + \Delta F \cos \theta_1$$
$$\vdots$$
$$(f_{0n} - f_{cn}) = f_0 - f_c + \Delta F \cos \theta_n$$

That is, the respective deviations $\Delta f_{10}, \Delta f_{11}, \ldots, \Delta f_{1n}$ of the base stations from the same ideal frequency $f_1$ are completely canceled and advantageously eliminated by the subtraction. As a result, the respective oscillation frequencies of the local oscillators of the base stations $BS_0$–$BS_n$ can be regarded as substantially the same.

As described above, the base station control equipment 46 of each of the base stations $BS_0$–$BS_n$ calculates the frequency difference $(f_{00}-f_{c0})$, $(f_{01}-f_{c1})$, ..., or $(f_{0n}-f_{cn})$ and reports the results of the calculation to the mobile local switch 50 (step S9).

The mobile local switch 50 searches the base stations BSmax and BSmin which have reported the maximum value Fmax and the minimum value Fmin, respectively, of the results of the calculation $(f_{00}-f_{c0})$, $(f_{01}-f_{c1})$, ..., $(f_{0n}-f_{cn})$ which the respective base stations have reported. In the embodiment of FIG. 2, the base stations BSmax and BSmin correspond to the base stations 30 and 26, respectively. Since the service zone of the microcell mobile communication is furthermore minimized from the microcells to the picocells because of effective use of the frequency, the base stations serving as detection points are considerably closely spaced. Thus, for the $\Delta F \cos \theta_n$ components of the maximum and minimum values Fmax and Fmin, $\theta_n$ is approximated as $\theta_n \approx 0$ or $\pi$.

In this case, approximation $\cos \theta_n \approx \pm 1$ can be made, and approximation can be made as follows:

$$Fmax = f_0 - f_c + \Delta F \qquad (2)$$

$$Fmin = f_0 - f_c - \Delta F \qquad (3)$$

The mobile local switch 50 subtracts the respective terms of expression (3) from the corresponding terms of expression (2) to obtain at step S10 the maximum Doppler shift frequency $\Delta F$ given by $$\Delta F = (Fmax - Fmin)/2 \qquad (4)$$

The mobile local switch 50 refers to map data stored therein to locate the base stations BSmax and BSmin which have reported the results of the detections Fmax and Fmin, respectively, to the switch 50 and sets a first straight line which connects the base stations BSmax and BSmin (step S11). When there are two base stations BSmax which have reported substantially equal maximum values Fmax, a straight line which connects the intermediate point between the two base stations BSmax and the base station BSmin which has reported the Fmin is used as the first straight line. When the two base stations BSmax and the base station BSmin are on the same straight line, this line is used as the first straight line. Similarly, when there are two base stations BSmin, a straight line which connects the intermediate point between the two base stations BSmin and the station BSmax is used as the first straight line. When the two base stations BSmin and the base station BS max are on the same straight line, this line is used as the first straight line.

When there are three base stations which reported substantially equal maximum values Fmax, and which are disposed at the respective vertexes of a triangle, a first straight line is set to coincide with a straight line bisecting the angle formed between a straight line on which the base station BSmin and two of the three vertexes are located and a straight line which connects the base station BSmin and the remaining vertex. When three base stations BSmax are present on the same straight line which passes through BSmin, this straight line is a first straight line. Similarly, various well-known techniques are applicable. For example, a first straight line may be set to pass through an intermediate point between the base stations obtained by weighting with a value of the Doppler shift frequency component. As one of such techniques, Maximum Likelihood Sequence Estimation Method is applicable.

The mobile local switch 50 calculates $\Delta F \cos \theta_0$, $\Delta F \cos \theta_1$, ..., $\Delta F \cos \theta_n$, using the processor 94, from the results of the detection $(f_{00}-f_{c0})$, $(f_{01}-f_{c1})$, ..., $(f_{0n}-f_{cn})$ which the respective base stations have reported thereto. That is, the following expressions are obtained from expressions (2) and (3):

$$Fmax + Fmin = 2(f_0 - f_c) \quad (f_0 - f_c) = (Fmax + Fmin)/2 \qquad (5)$$

By subtracting the value of expression (5) (fixed value) from the respective $(f_{00}-f_{c0})$, $(f_{01}-f_{c1})$, ..., $(f_{0n}-f_{cn})$, the values of $\Delta F \cos \theta_0$, $\Delta F \cos \theta_1$, ..., $\Delta F \cos \theta_n$ of the base stations are calculated.

When $\theta_n = \pm \pi/2$, the fixed value is obtained from $(f_{0n}-f_{cn}) = f_0 - f_c$.

The base stations which have reported the substantially zero value or substantially minimum value of the Doppler shift component, i.e., $\theta_n \approx \pi/2$ or $3\pi/2$, are sought and a second straight line is set to pass through those base stations and extend in a direction substantially perpendicular to the first straight line. As described above, instead of searching the base stations (for example, in the example of FIG. 2, base stations 20, 21, 24, 27, etc.), which have detected substantially zero value of the Doppler shift component, the base stations may be searched where the values of the Doppler shift component $\Delta F \cos \theta_n$ are opposite in sign (step S12). Also, in this case, Maximum Likelihood Sequence Estimation Method is applicable.

The position of the target mobile object and its speed and direction of movement are obtained from the various values calculated by the above processing, as follows. The position of the mobile object is obtained as a point where the first and second straight lines intersect. The speed of movement of the object is obtained by substituting the value of $\Delta F$ obtained in expression (4) and $\cos \theta = 1$ into expression (1). The direction of movement of the object is obtained as being a direction from the base station BSmin toward the base station BSmax (step S13).

In the above example, the second straight line is set to pass through the two base stations which have detected substantially zero value of the Doppler shift component and intersect with the first straight line substantially at the right angle. However, two stations which have detected the respective Doppler shift frequency components having substantially equal values and shift directions opposite each other may be sought and a straight line which passes through those base stations or their vicinities may be set as a second straight line. For example, assuming that the base station 22 detects an up shift value of 37 Hz while the base station 33 detects a down shift value of 37 Hz in FIG. 2, a straight line 9 which passes through those base stations 22 and 33 may be set as a second straight line and a point where the first and second straight lines 11 and 9 intersect may be detected as the position of the mobile object.

Further in the above example, the first straight line is set to pass through the base stations which have detected the maximum up and down frequency shift values. However, the arrangement may be such that two or more straight lines 9 which satisfy the above conditions may be set and the respective points where the straight lines intersect may be detected as the possible positions of the mobile object, when detecting only the position of the mobile object. For example, in FIG. 2, assuming that the base station 28 detects an up shift value of 7 Hz while the base station 25 detects a down shift value of 7 Hz in FIG. 2, a straight line 8 which passes through those base stations may be set and a point where the straight line 8 and the other straight line 9 which satisfies the above conditions intersect may be detected as the position of the mobile object.

In the mobile object detecting process shown in the flowchart of FIG. 1, calibration is made at steps S4, S5, S6, and S9, although the calibration may be made at steps S4, S5, S6, S7, in that order, after step S8, in order to cope with a possible deviation of the oscillation frequency of the local oscillator of each of the base stations from a reference value within an allowable range of frequency deviation under technical standards of the oscillation frequency, although the oscillatory frequency has a satisfactory short-time stability. Alternately arrangement may be such that the mobile local switch 50 feeds a reference clock signal to the respective base stations and the signal generated in each of the base stations is synchronized with the reference clock signal, thereby causing all the signals in the respective base stations to coincide with each other.

For example, the mobile local switch 50 feeds an optical intensity modulated signal, which is modulated with the reference clock signal, for example, an optical signal of a light intensity modulation (IM) wave of 1.9 GHz, through a wide band transmission path (for example, of a line 52 of FIG. 6) of an optical fiber or the like. This allows all the local oscillation frequencies of the base stations to coincide with $f_1$ to further simplify the steps of the process.

The principle of detecting the Doppler shift component in that case will be described on the basis of the expressions mentioned above. When the steps S4–S6 are omitted in the flowchart of FIG. 1, the result of the detection at step 8 is given as follows:

$$f_{00} = f_0 - f_1 + \Delta F \cos \theta_0$$

$$f_{01} = f_0 - f_1 + \Delta F \cos \theta_1$$

$$\vdots$$

$$f_{0n} = f_0 - f_1 + \Delta F \cos \theta_n$$

The respective base stations $BS_0$–$BS_n$ report the results of the measurement to the mobile local switch 50 as in the flowchart of FIG. 1 (step S9). The switch 50 searches and selects the base stations BSmax and BSmin which have reported to the switch 50 the maximum and minimum values Fmax and Fmin, respectively, of the results of the measurement. Thereafter, the step S10 and subsequent steps as shown in FIG. 1 are carried out to obtain:

$$Fmax = f_0 - f_1 + \Delta F \quad (2)'$$

$$Fmin = f_0 - f_1 - \Delta F \quad (3)'$$

From equation (2)' minus equation (3)', the maximum Doppler shift frequency $\Delta F$ is calculated at the step S10 as $$\Delta F = (Fmax - Fmin)/2 \quad (4)'$$

The step 11 is the same as above-mentioned, and further description thereof will be omitted.

Furthermore, $\Delta F \cos \theta_0$, $\Delta F \cos \theta_1$, ..., $\Delta F \cos \theta_n$ are similarly obtained by subtracting the value (fixed) of the following expression (6) from the respective values of $f_{00}$, $f_{01}$, ..., $f_{0n}$ (step S12):

$$(f_0 - f_c) = (Fmax + Fmin)/2 \quad (6)$$

Since the step S13 is the same as above-mentioned, further description thereof will be omitted.

Figure 9:
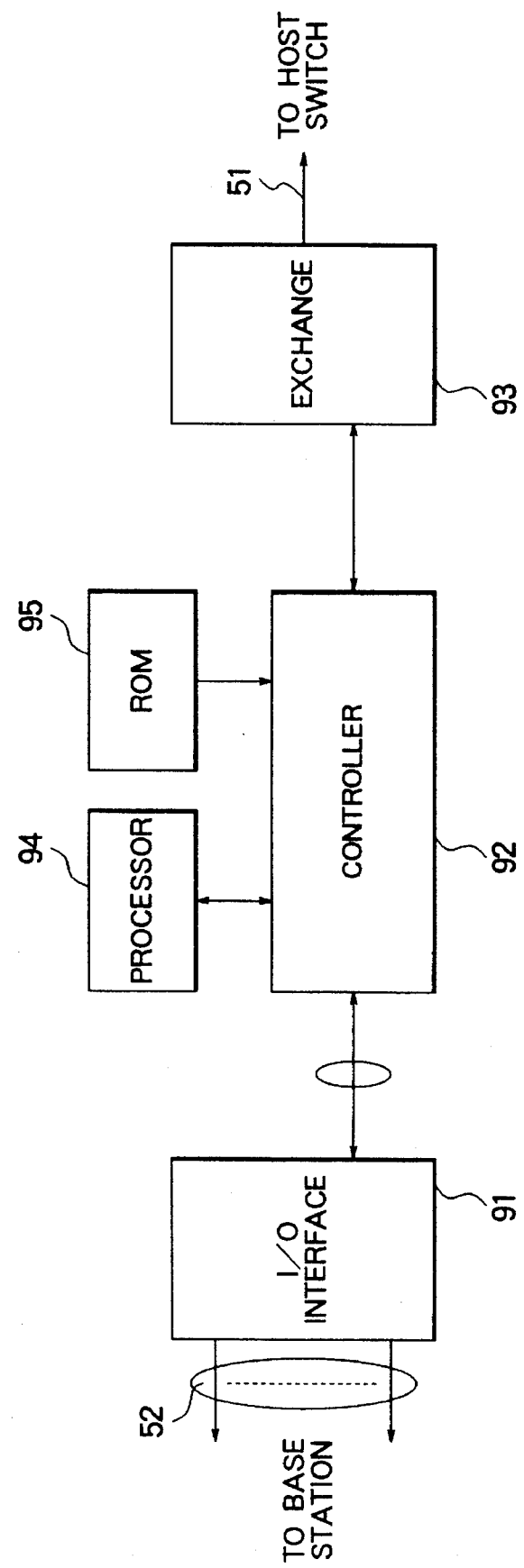
FIG. 9 is a block diagram indicating the structure of a mobile local switch.

The base station control equipment (BCE) 46 of each of the base stations executes steps S4 and S9 of the flowchart of FIG. 1 except for a step S7. To this end, the control equipment 46 has a ROM (not shown) which stores a program to execute those steps and a microcomputer (not shown) which executes the program. The mobile local switch 50 executes the steps S1–S3, S6 and S10–S13. As shown in FIG. 9, the switch 50 is provided with an exchange 93 connected through a circuit 51 to a higher-rank exchange (not shown), an I/O interface 91 connected through a circuit 52 to a corresponding base station (not shown), a ROM 95 which stores a program to execute the respective steps of the process, a processor 94 which performs at each step a predetermined operation on data received through a controller 92 from a base station, and the controller 92 which controls the predetermined operation of the processor 94.

A second embodiment of the present invention will be described with reference to FIG. 10. As described above, in the first embodiment, the first straight line is determined in order to connect the base stations corresponding to $\theta_n \approx 0$ or $\pi$, and the second straight line is determined to pass through a base station corresponding to $\theta \approx \pi/2$ and intersect with the first straight line at a right angle. In the second embodiment, a straight line is first determined in order to connect the base stations corresponding to $\theta \approx \pi/2$ and a second straight line is determined to pass through a base station corresponding to $\theta_n \approx 0$ or $\pi$ and intersect with the first straight line at right angle.

Figure 10:
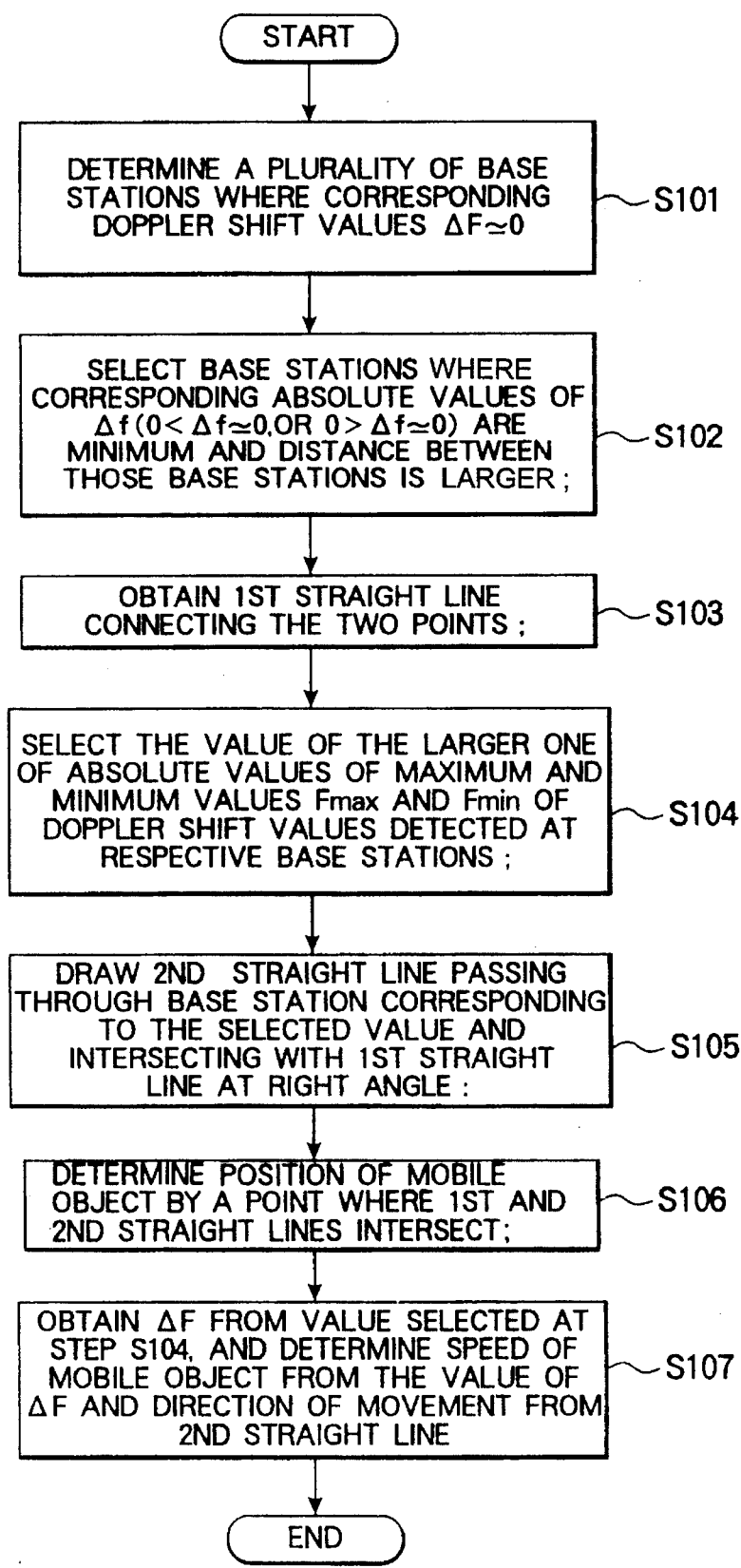
FIG. 10 is a flowchart indicating the steps of a method of determining the position of a mobile object according to a second embodiment of the present invention.

As shown in FIG. 10, a plurality of base stations detecting the Doppler shift component $\Delta f \approx 0$ ($\theta \approx \pi/2$) are determined (step S101). Among the above base stations, a base station where the value of the Doppler shift component $\Delta f$ is positive and its absolute value is minimum and another base station where the value of the Doppler shift component $\Delta f$ is negative and its absolute value is minimum are selected (step S102). A first straight line is sought to connect those selected base stations (step S103). When at the step S102 there are two or more base stations where the value of the Doppler shift component $\Delta f$ is positive and its absolute value is minimum and/or two or more base stations where the value of the Doppler shift component $\Delta f$ is negative and its absolute value is minimum, the two base stations are selected such that the distance between them is longer than a distance between any other two stations (step S102).

The larger one of the absolute values of the maximum and minimum values Fmax and Fmin of the Doppler shift component is selected (step S104). A second straight line is drawn which passes through a base station corresponding to the selected value and intersects with the first straight line at a sight angle (step S105). The point where the first and second straight lines intersect is determined as the position of the mobile object (step S106). $\Delta F$ is obtained from the value Fmax or Fmin selected at step S104, the speed of movement of the mobile object is obtained from the value of $\Delta F$, and the direction of the second straight line is determined as the direction of movement of the mobile object (step S107).

As a specific case in determination of a position of the mobile object, it is possible that the previous position of the object just before a new measurement can be estimated from the result of the past measurements. In that case, it is sufficient to determine the base station which detects the Doppler shift component having a value $\Delta F \approx 0$ at the step S102. Then, a first provisional straight line is drawn so as to pass the base station having a substantially zero value of the Doppler shift component and extend toward the estimated previous position of the mobile object and a second provisional straight line is drawn to pass a base station having a Doppler shift component having a value as selected in the step 104 and extend toward the estimated previous position of the mobile object. Thereafter, the first and second provisional straight lines are slightly shifted, if necessary, so as to cause them to intersect at a right angle with each other. Then, the new position of the mobile object is determined as a position where the shifted first and second straight lines intersect at a right angle with each other.

In the second embodiment, the speed of movement of the mobile object is sought from the larger, for example, Fmax, of the absolute values of the maximum and minimum values Fmax and Fmin of the Doppler shift component measured by the base stations. However, it is not always possible to select the maximum value or minimum value of the Doppler shift component because the number of the base stations which conduct the measurement of the Doppler shift component is limited.

Figure 11:
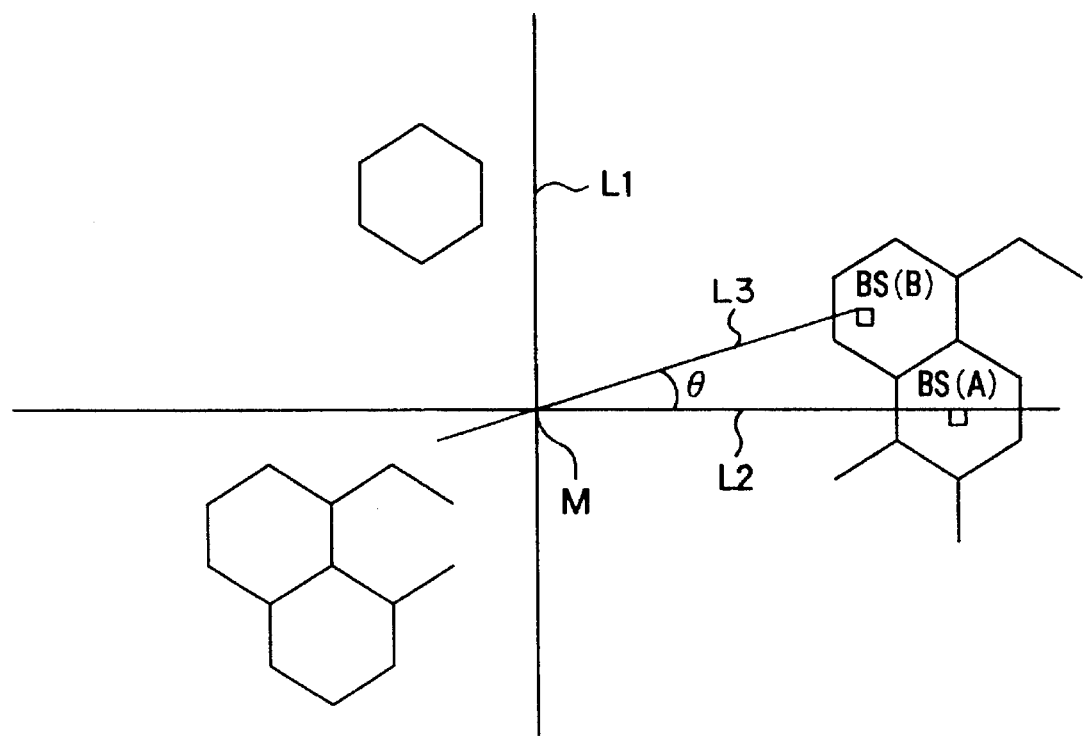
FIG. 11 illustrates a modification of the second embodiment.

A method of correcting an error involved in the measurement to improve the accuracy of measuring the speed of movement of the mobile object will be described next with reference to FIG. 11. Let the larger of the absolute values of the maximum and minimum values of the Doppler shift components obtained at the step S104 of the flowchart of FIG. 10 be, for example, |Fmax|=A. A base station BS(B) is selected which corresponds to a Doppler shift component, where the absolute value B is close to A with the value of B/A being within a predetermined range, for example, $0.60 \leq B/A \leq 0.85$.

The value of an angle θ is sought to satisfy:

$$\cos \theta = B/A$$

and a third straight line is drawn which passes through the base station BS(B) and intersects with the second straight line at an angle θ. In FIG. 11, L1 denotes the first straight line; L2 the second straight line which passes through the base station BS(A) where |Fmax|=A; and L3 the third straight line which passes through the base station BS(B). If the first and second straight lines L1 and L2 are correct, the third straight line is to pass through a point M where L1 and L2 intersect or the vicinity of the point M. If the third straight line L3 has deviated greatly from the point M, |Fmax|=A is considered to deviate greatly from the actual maximum value. Then, the value of x which satisfies cos θ=B/x is conversely sought and the speed of movement of the mobile object is sought, using |Fmax|=x in place of |Fmax|=A. This improves the accuracy of measuring the speed of movement of the mobile object.

Figure 12A:
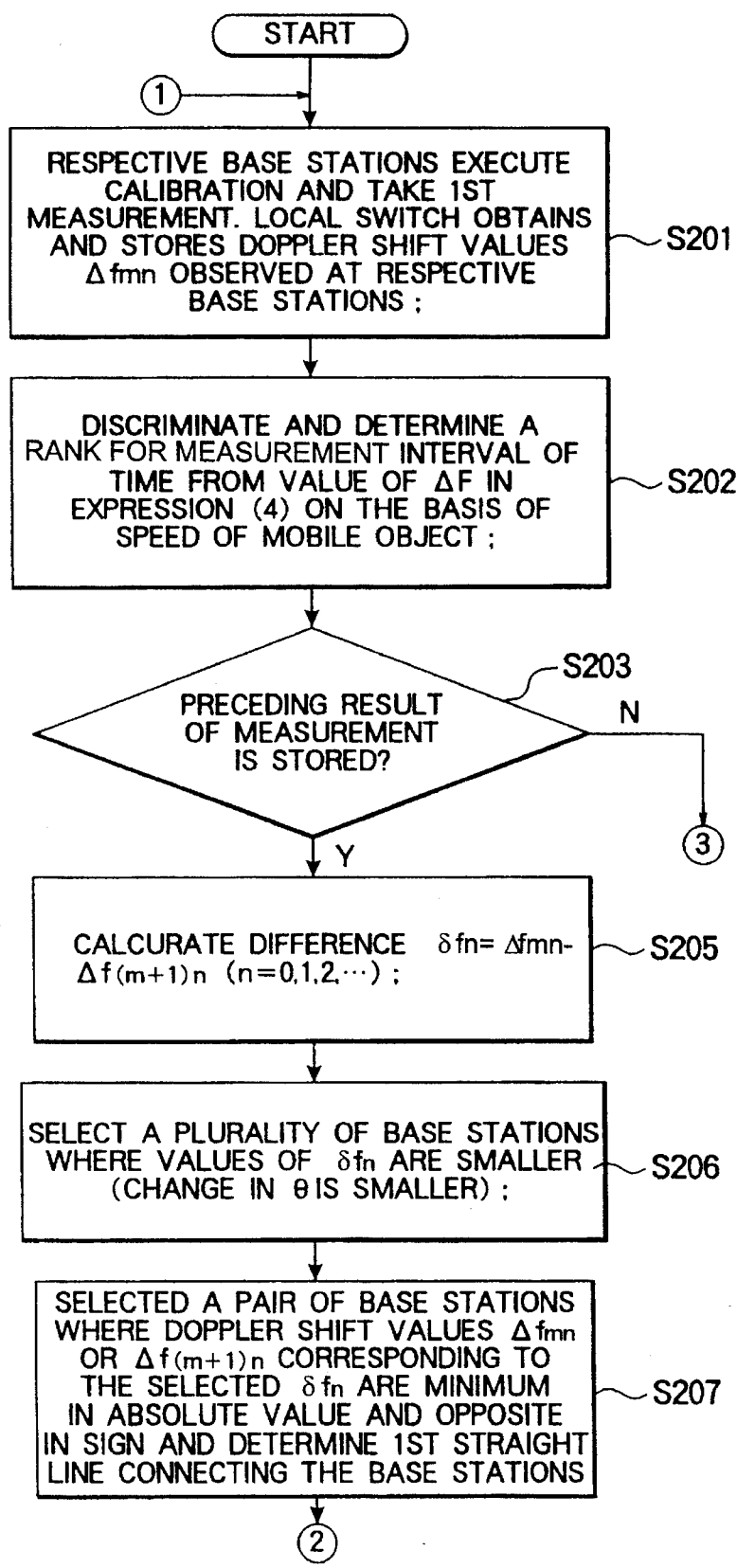

A third embodiment of the present invention will now be described with reference to FIGS. 12A, 12B and 13. The third embodiment repeats at least twice the measurement made in the first embodiment to obtain the position of the mobile object, its speed and direction of movement and a change of its direction of movement from the results of the measurements.

First, the base stations calibrate the respective oscillation frequencies of the local oscillators thereof, and measures the received frequency initially. The switch 50 calculates the respective values of the Doppler shift component $\Delta f_{1n}$ (n=0, 1, 2, ..., n) at the base stations $BS_0$–$BS_n$ on the basis of the measured frequency values and stores those values of the Doppler shift component (step 201). This measurement is iterated under certain conditions, as will be described later. Therefore, at step S201, generally, a m-th measurement where m=1, 2, 3, ... is taken, and the value $\Delta f_{mn}$ of the Doppler shift component for the base station $BS_n$ is calculated and stored. The measurements at the respective base stations are started in accordance with an instruction from the switch 50, at which time a timer (not shown) of the controller 92 of the switch 50 is set. The switch 50 then calculates the maximum value ΔF of the Doppler shift component from the Doppler shift values in the respective base stations, calculates the moving speed of the mobile object from ΔF and determines the rank of a measurement interval of time corresponding to the speed of the mobile object from a table prepared beforehand (step S202). Table I below representatively shows the ranks of measurement interval of time corresponding to the speeds of the mobile object. When the radius of cells of the mobile communication system is small, the measurement interval of time is set to be small. The relationship between the speed of the mobile object and the measurement interval of time is optionally determined depending on the purpose of measurement of the object's position and the circumstances of a space through which the mobile object moves.

TABLE I

|  | speed per hour (km/h) | speed per second (m/s) | interval of time |
|---|---|---|---|
| Rank 1 | ≤10 | ≤2.8 | 5 seconds |
| Rank 2 | 10–36 | 2.8–10 | 1 second |
| Rank 3 | 36–72 | 10–20 | 0.5 seconds |
| Rank 4 | ≥72 | ≥20 | 0.1 seconds |

Control then passes to a step S203, where it is checked whether the result of the preceding measurement is stored. If not, control passes to a step S204. When a measurement interval of time corresponding to the rank determined at the step S202 has elapsed after this measurement (step S203), control returns to the step S201, where the following measurement is taken. When it is determined at the step S203 that the result of the preceding measurement is stored, control passes to a step S205, where the difference between the $\Delta f_{mn}$ obtained and stored at the preceding measurement and the $\Delta f_{(m+1)n}$ obtained at the current measurement taken this time, i.e. $\delta f_n = \Delta f_{mn} - \Delta f_{(m+1)n}$, is calculated. A plurality of differences $\delta f_n$ having a smaller absolute value is selected from the differences $\delta f_n$ in the respective base stations (step S206). That the $\delta f_n$ is small implies that the change in the angle θ between the direction of the mobile object as viewed from the base station concerned and the direction of movement of the mobile object is small. In this case, when the absolute value of each of $\Delta f_{mn}$ and $\Delta f_{(m+1)n}$ is small, it indicates that the base station has deviated greatly from the straight line indicative of the direction of movement of the mobile object. On the other hand, when the absolute value of each of $\Delta f_{m \cdot n}$ and $\Delta f_{(m+1)n}$ is large, it is implied that the base station is on, or in the vicinity of, the straight line indicative of the direction of movement of the mobile object.

Two base stations are selected where the values of $\Delta f_{mn}$ or $\Delta f_{(m+1)n}$ involved in the selected $\delta f_n$ are minimum in absolute value and opposite in sign, and a first straight line is drawn which connects those selected base stations (step S207). Two base stations are then selected where the values of $\Delta f_{mn}$ or $\Delta f_{(m+1)n}$ involved in the selected $\delta f_n$ are maximum in absolute value and opposite in sign, and a second straight line is drawn which connects those selected base stations (step S208). The point where the first and second straight lines intersect is determined as the position of the mobile object (step S209).

The speed of movement of the mobile object is calculated as θ=0 in expression (1) from the maximum of the absolute values of $\Delta f_{mn}$ or $\Delta f_{(m+1)n}$ and the direction of movement of the mobile object is determined from the second straight line (step S210).

A plurality of larger of the absolute values of $\delta f_n$ at the respective base stations are selected (step S211). That the absolute value of $\delta f_n$ is large indicates that the angle θ between the direction of the mobile object as viewed from the base station concerned and the direction of movement of the mobile object is equal or close to π/2 or that the direction of movement of the mobile object obtained in the preceding measurement greatly differs from that obtained in the current measurement. The absolute values of $\Delta f_{mn}$ and $\Delta f_{(m+1)n}$ corresponding to the selected $\delta f_n$ and having the same sign are then compared with each other and it is determined that the direction of movement of the mobile object, or the direction of the second straight line has changed to the direction of a straight line which connects the base stations where $\Delta f_{(m+1)n}$ is larger in absolute value than $\Delta f_{mn}$ (step S212).

Figure 13:
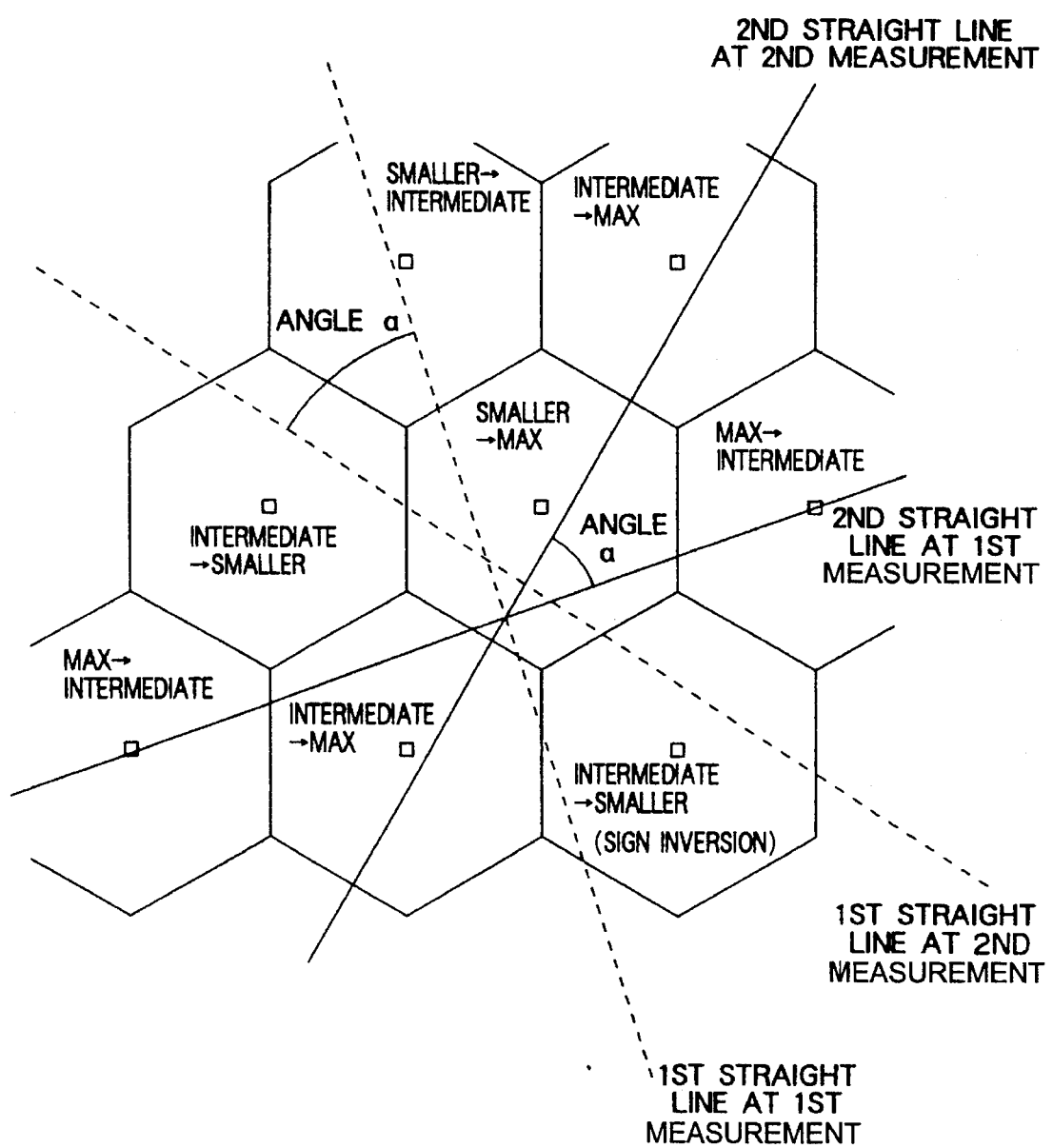
FIG. 13 illustrates a method of measuring a deviation in the direction of movement of a mobile object.

This is shown in FIG. 13 in which "intermediate→max" and "smaller→max" indicate that $\Delta f_{(m+1)n}$ is larger in absolute value than $\Delta f_{mn}$, and "max→intermediate" and "intermediate→smaller" indicates that $\Delta f_{(m+1)n}$ is smaller in absolute value than $\Delta f_{mn}$. When a comparison between the direction of movement of the mobile object obtained at the step S210 and the new direction of movement of the mobile object obtained at the step S212 indicates that no great difference exists between them, it is determined that the result of the measurement is correct.

The controller 92 detects a change of the direction of movement of the mobile object on the basis of the old direction of movement of the mobile object obtained at the step S210 and the new direction of movement of the mobile object obtained at the step S212 (step S213, S214). When this change is greater than a predetermined value, control passes to the step S204, where the controller 92 checks whether a predetermined time has elapsed. After a lapse of the predetermined time, control then returns to the step S201, where the controller 92 further traces the movement of the mobile object. When the change of the direction of movement of the object is smaller than the predetermined value, control passes to a step S215, where the controller 92 determines from a flag set at a predetermined address in a memory (not shown) whether this measurement is set in a continuous mode. If so, control passes to the step S204, where the controller 92 checks whether a predetermined time has lapsed since the current measurement. If so, control returns to the step S201, where the controller 92 takes the next measurement. When the continuous mode is not set, the controller 92 stops the measurement.

Figure 7:
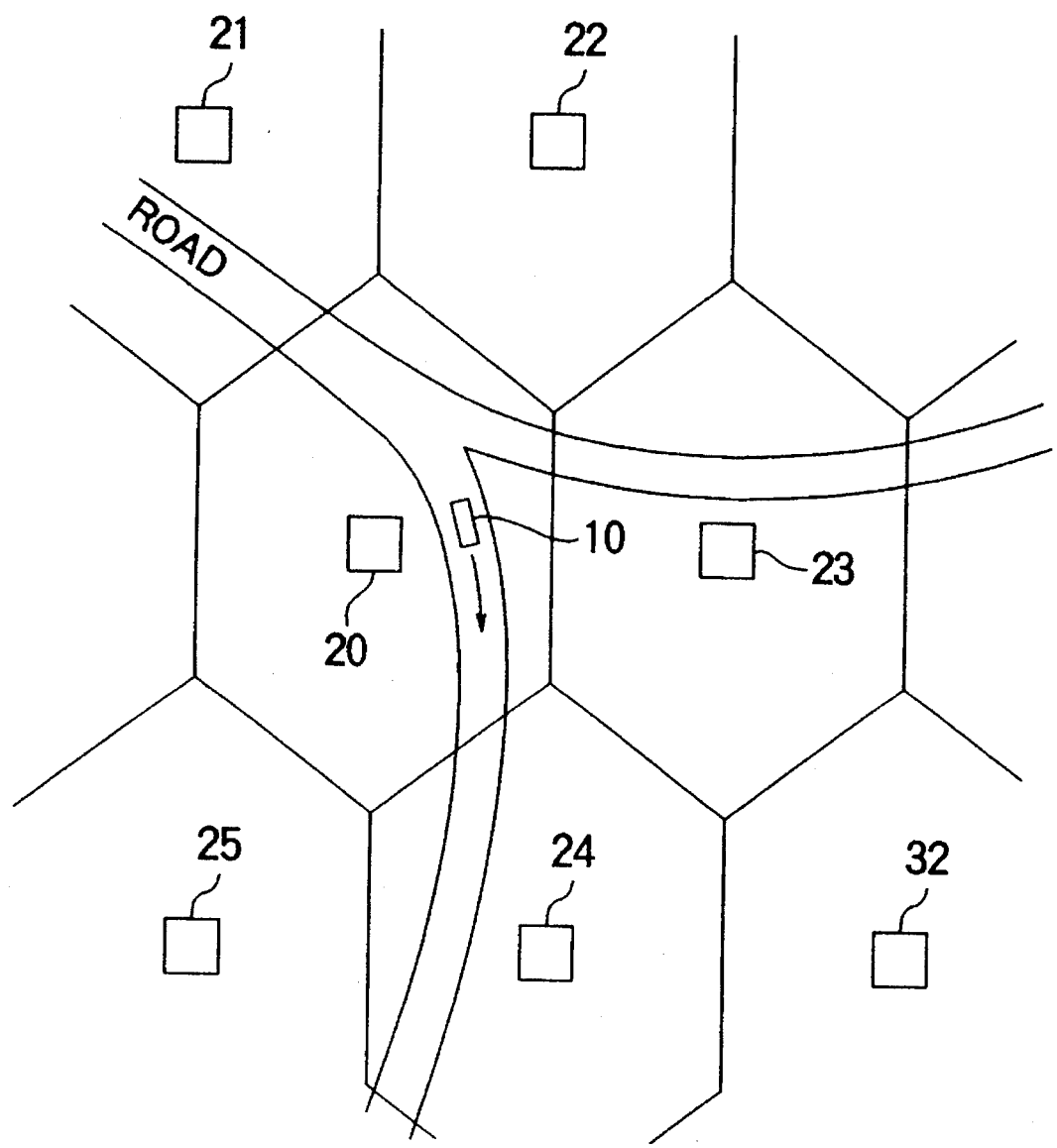
FIG. 7 illustrates a zone switching operation using road map information according to one embodiment of the present invention.

The mobile local switch 50 switches the service zone for the mobile object on the basis of the position of the mobile object and its direction and speed of movement. Preferably, such zone switching operation is performed by reference to road map information. For example, when the switch 50 reads map information on the vicinity of the mobile object 10 from a map information storage provided, for example, in the ROM 95 of the switch 50 and detects that the mobile object 10 is moving along a road shown by a curve in the direction of an arrow in the service zone of the base station 20, as shown in FIG. 7, the switch 50 prepares for switching the service for the moving object from the zone 20 to the zone 24 by additionally considering road map information. At this time, when the detected position of the mobile object is out of the road, the detected position of the mobile object is corrected such that the object is on the road. This process is called "map matching".

For example, when a car navigation function is added to the mobile communication system, the switch 50 reports to the mobile object the detected position, etc., of the mobile object through the base station in the service zone where the mobile object is currently traveling or paused. More particularly, the switch 50 reports the detected position, etc., of the mobile object through the wire transmission path to the base station in the service zone where the mobile object is currently traveling or paused and that base station reports the information by radio wave to the mobile object. Alternatively, arrangement may be such that the switch 50 reports the detected position, etc., of the mobile object by radio wave directly to the mobile object without the aid of the base station in the zone where the mobile station is currently traveling or paused.

Figure 8:
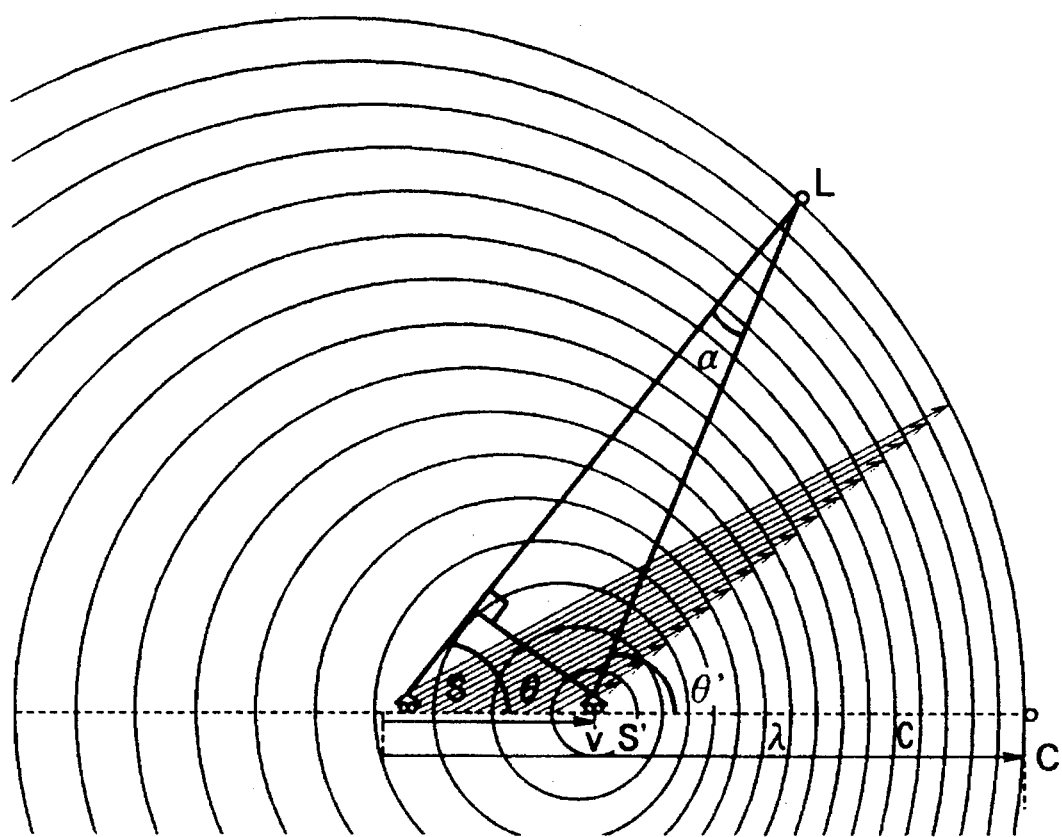
FIG. 8 illustrates the principle of detecting a Doppler shift component.

Finally, a method of introducing the expression (1) will be described next. For convenience of explanation, assume that a base station L receives a peak of the first level of radio wave of a frequency $f_0$ transmitted from a mobile object, which is moving at a speed of v m/sec at a point S, at 1/N seconds after transmission of the radio wave, as shown in FIG. 8. Assuming that the base station L exists in a direction, as viewed from the mobile object, at an angle of θ with the direction of movement of the mobile object, the distance between the base station L and the position S is C/N m where C is the speed in propagation of the radio wave. The mobile object moves to a point S' which is V/N m distant from the point S after a lapse of 1/N seconds and the direction of the base station L as viewed from the mobile object changes from an angle of θ to an angle of θ' with the direction in which mobile object is moving. The total number of peaks in level of the radio wave which the mobile object has transmitted during the movement of the mobile object from the point S to the point S' is $f_0/N$. Thus, there are the total number of $f_0/N$ peaks in level of the radio wave between the point S' and the base station L. The arrows extending from the respective points on a line which connects the points S and S' represent the directions of propagation of the peaks in the level of the radio wave transmitted from the mobile object as it moves and the distances which the radio wave has traveled.

Let the distance between the point S' and the base station L be R. The wavelength λ of the radio wave which travels the distance R is given by $$\lambda = R/(f_0/N) \tag{A1}$$

The speed of movement of the mobile object is generally given by $$v = \Delta f \cdot \lambda_0 \tag{A2}$$

Referring to FIG. 8, $$R \cos \alpha = C/N - (v/N) \cos \theta \tag{A3}$$

$$R \sin \alpha = (v/N) \sin \theta \tag{A4}$$

Thus, eliminating α from the equations (A3) and (A4), we obtain $$R = (C/N)[1 - 2(v/C) \cos \theta + (v/C)^2]^{1/2} \tag{A5}$$

Substituting the equation (A5) into the equation (A1), we obtain $$\lambda = (C/f_0)[1 - 2(v/C) \cos \theta + (v/C)^2]^{1/2} \tag{A6}$$

Let the frequency of the radio waves corresponding to that wavelength be f. Since $f = C/\lambda$, we obtain $$f = f_0/[1 - 2(v/C) \cos \theta + (v/C)^2]^{1/2} \tag{A7}$$

Since the Doppler shift component $\Delta f$ is $(f - f_0)$, we obtain $$\Delta f = [1 - [1 - 2(v/C) \cos \theta + (v/C)^2]^{1/2}] f_0 / [1 - 2(v/C) \cos \theta + (v/C)^2]^{1/2} \tag{A8}$$

Considering $v/C \ll 1$, a third term $(v/C)^2$ in a root sign of each of a numerator and a denominator of the expression (A8) is negligible compared to its first and second terms. By expanding into series a term involving the root sign of each of the numerator and denominator of the expression (A8) and leaving its first term unchanged, we obtain $$\Delta f \approx (v/C)f_0 \cos\theta/[1-(v/C)\cos\theta] \quad \quad (A9)$$
$$\approx (v/C)f_0 \cos\theta$$
$$= (v/\lambda_0)\cos\theta$$
$$= \Delta F \cos\theta$$

Substituting the expression (A9) into the expression (A2), we obtain the expression (1).

In the above description, the measurement is applied to only one mobile object. However, it will be obvious that when two or more mobile objects are in the same service zone, the respective positions of the mobile objects and their speeds and directions of movement can be detected in parallel by executing the respective mobile object detection processes in parallel. In this case, it is preferable from a standpoint of optimization of network control and radio channel control that when the microcells overlap, the respective positions of the mobile objects and their speeds and directions of movement are detected by distributing the works for the detection among the base stations in the overlapping microcells or by allotting the works to several base stations located in appropriate detection points under control of another mobile local switch (MLS), thereby limiting the detection work of each base station.

When the present invention is applied to the above-mentioned VICS system or the location detection system, it will be apparent from the above description that the density of installed base stations and the frequency of the unmodulated radio wave transmitted from the mobile object to be detected should be selected depending on roads, passageways, stairs as points where observation points are to be set, the situation of a zone where the detection is desired, the intervals between base stations involved in the detection and the resolution of the detection. For example, referring to FIG. 4, the frequency of the unmodulated radio wave is required to be set at a maximum available one in order to generate a large Doppler shift component also for a low speed mobile object.

In the above embodiments, all the base stations are assumed to be disposed on substantially the same plane. However, the respective base stations may be disposed in a three-dimensional space, for example on different floors of a building, in which case the position of a PHP, which is moving on stairs or is conveyed on an elevator, and the speed and direction of movement of the PHP are detectable in a three-dimensional manner.

Further, the above embodiments are explained as examples with respect to a case where a base station in a zone where the mobile object is traveling transmits the unmodulated calibrating radio wave. However, the unmodulated calibrating radio wave may be transmitted from an appropriate fixed device such as one of other distributed devices different from the base stations or a mobile local switch.

While in the above embodiments the mobile radio communication system of the invention is applied to the time division multiple access (TDMA) system as an example, it is obvious that the mobile radio communication system of the invention is applicable to other digital systems such as code division multiple access (CDMA) systems and analog systems such as frequency division multiple access (FDMA) systems. Since the invention is based on detection of frequency, the time taken for the detection is short, for example, several seconds as compared with the conventional method.

Further, the invention has been explained with respect to a case in which a multiplicity of base stations detect the frequency of a signal transmitted from the mobile object. However, it is apparent that the invention can be arranged such that the mobile object sequentially receives broadcast information signals which the base stations transmit periodically. In this case, however, a work required by the mobile object would be large, so that the arrangement would not be suitable for a portable telephone set, which is desired to be minimized.

While the present invention has been illustrated using a mobile communication system such as a PHP and a car telephone system as an example, it is clear that the present invention is applicable to the detection of the position of a robot or an unattendant car which travels outdoors or in a factory and a mobile object's position determining system such as a navigation system for a car which travels on a road.

A mobile object position determining system for a robot or a car may be arranged such that a radio wave transmitter mounted on the mobile object is separated from the object and moved at a predetermined speed higher than the mobile object while transmitting a radio wave to generate a larger Doppler shift component than the speed of the mobile object and hence determine the position of a stationary device.

The detection of the Doppler shift component $\Delta f$ described so far is based on the detection of a Doppler shift value of an unmodulated radio wave in order to facilitate the detection of $\Delta f$ since only the amplitude and phase of a received signal change even if a waveform distortion occurs due to multipass as a result of transmission of unmodulated sinusoidal wave (carrier wave) used in a PHP, etc.

When the amplitude of the unmodulated signal wave is extremely small, the accurate detection of its frequency is difficult. In this case, it will be clear that application of a directional antenna and various diversity systems is advantageous.

Detection of the Doppler shift component, however, is not impossible in a modulated wave. Detection of a Doppler shift is actually possible in a GPS receiver. That is, in this receiver, a Doppler shift value of a carrier frequency is detected by demodulation of a CDMA system BPSK (binary phase shift keying) signal.

It will also be obvious that since the central frequency and shift frequency of the FSK (frequency shift keying) signal are both subjected to the same Doppler shift, the Doppler shift value is detectable, for example, from an output shift value of a discriminator of the receiving end. However, it is considered that since the band of the modulated signal is expanded, the radio wave is likely to be subjected to so-called selective fading during its propagation in the space. Thus, the detection of a Doppler shift value corresponding to a modulation/demodulation system would need to be studied.

As described above in detail, the mobile communication system and the position determining system according to the present invention are constructed such that the detection of a frequency shift component based on the Doppler effect generated due to the movement of the mobile object is realized by the peripheral base stations' measurement of a radio wave transmitted from the mobile object. Thus, these systems are advantageous in that the work processed by the mobile object is minimized and that three items, that is, the position of the mobile object and its speed and direction of movement can be measured simultaneously. Those advantages are not obtained by conventional systems.

The mobile communication system of the invention provides a measuring method which utilizes the frequency of the radio wave and an increasing density of the peripheral base stations (measuring points) unlike a conventional measuring method which utilizes the power (field strength) of the radio wave. Thus, the mobile communication systems of the invention greatly improves the required detection time, detection resolution and detection accuracy.

In addition, the mobile communication system of the invention greatly reduces the required detection time and greatly improves the detection resolution and accuracy. Thus, the quickening of the handoff which is especially a problem in a very small cell system and the control of a communication network when using a dynamic channel allocating method such as a so-called speed and moving direction method (SMD) are advantageously facilitated.

According to the mobile communication system of the invention, the position of the mobile object and its speed and direction of movement are detected rapidly with excellent accuracy. Thus, high service for the mobile object is realized more easily than the conventional systems in the flexible control of a network involving techniques such as so-called handoff or in a VICS or location detection system. In particular, the inventive mobile object communication means is considered to be detection means suitable for SMD method described, for example in 1992-Autumn Meeting, Institute of Electronic, Information and Communication Engineers of Japan, B-320. In the future, a mobile communication system can be provided which further facilitates fine services realized by correct recognition of the mobile object and control of an intelligent network.

According to the present invention, in a VICS system, a so-called location detection system and a mobile communication system which constitutes a three-dimensional service zone in a building, information on the position of the mobile object and its speed and direction of movement is obtained rapidly and accurately in comparison with the corresponding conventional systems. Thus, the inventive system can be used without lowering its throughput even when many mobile objects are served.

According to the mobile communication system of the invention, it is possible advantageously to detect a mobile object substantially being paused when the frequency shift component due to the Doppler effect is substantially zero.

What is claimed is:

1. A method of determining a position of a mobile object, comprising the steps of:

transmitting a radio wave of a constant frequency from said mobile object;

receiving the radio wave transmitted from said mobile object and detecting the frequency of the received radio wave at each of a plurality of spaced positions in an area where said mobile object is movable;

determining a plurality of Doppler shift signals observed at the respective spaced positions, each Doppler shift signal being indicative of a Doppler shift value dependent on a movement of the mobile object, on the basis of frequencies of the received radio wave detected at the respective positions, respectively;

selecting at least two Doppler shift signals which satisfy predetermined two different conditions, respectively, among the plurality of Doppler shift signals;

obtaining the position of said mobile object from position data indicating the positions corresponding to the selected Doppler shift signals; and wherein the selected Doppler shift signals comprise a first Doppler shift signal which provides a maximum value of upward Doppler shift values, a second Doppler shift signal which provides a maximum value of downward Doppler shift values and a third Doppler shift signal which provides a minimum value of the upward and downward Doppler shift values which are represented by the respective Doppler shift signals.

2. A method according to claim 1, wherein the position of said mobile object is determined by a point where a first straight line and a second straight line intersect, the first straight line connecting a first position corresponding to the first Doppler shift signal and a second position corresponding to the second Doppler shift signal, and the second straight line passing through a third position corresponding to the third Doppler shift signal and being perpendicular to the first straight line.

3. A method of determining a position of a mobile object, comprising the steps of:

transmitting a radio wave of a constant frequency from said mobile object;

receiving the radio wave transmitted from said mobile object and detecting the frequency of the received radio wave at each of a plurality of spaced positions in an area where said mobile object is movable;

determining a plurality of Doppler shift signals observed at the respective spaced positions, each Doppler shift signal being indicative of a Doppler shift value dependent on a movement of the mobile object, on the basis of frequencies of the received radio wave detected at the positions, respectively;

selecting at least two Doppler shift signals which satisfy predetermined two different conditions, respectively, among the plurality of Doppler shift signals;

obtaining the position of said mobile object from position data indicating the positions corresponding to the selected Doppler shift signals; and wherein the selected Doppler shift signals comprise a first Doppler shift signal which provides a maximum value of upward Doppler shift values, a second Doppler shift signal which provides a maximum value of downward Doppler shift values and a third and a fourth Doppler shift signals which provide substantially equal upward and downward shift values, respectively, among the upward and downward shift values represented by the respective Doppler shift signals.

4. A method according to claim 3 wherein the position of said mobile object is determined by a point where a first straight line and a second straight line intersect, the first straight line connecting a first position corresponding to the first Doppler shift signal and a second position corresponding to the second Doppler shift signal, and the second straight line connecting a third position corresponding to the third Doppler shift signal and a fourth position corresponding to the fourth Doppler shift signal.

5. An apparatus for determining a position of a mobile object, comprising:

means provided at each of a plurality of spaced positions for receiving a radio wave of a constant frequency transmitted from the mobile object and detecting a frequency of the radio wave;

means for generating a plurality of Doppler shift signals observed at the respective spaced positions, each Doppler shift signal being indicative of a Doppler shift value dependent on a movement of the mobile object, on the basis of frequencies of the received radio wave detected at the respective positions;

means for selecting at least two Doppler shift signals which satisfy predetermined two different conditions among the plurality of Doppler shift signals;

means for determining the position of the mobile object from position data indicating the positions corresponding to the selected Doppler shift signals; and wherein the selected Doppler shift signals comprise a first Doppler shift signal which provides a maximum value of upward Doppler shift values, a second Doppler shift signal which provides a maximum value of downward Doppler shift values and a third Doppler shift signal which provides a minimum value of the upward and downward Doppler shift values which are represented by the plurality of Doppler shift signals, respectively.

6. An apparatus according to claim 5, wherein the position of said mobile object is determined by a point where a first straight line and a second straight line intersect, the first straight line connecting a first position corresponding to the first Doppler shift signal and a second position corresponding to the second Doppler shift signal, and the second straight line passing through a third position corresponding to the third Doppler shift signal and being perpendicular to the first straight line.

7. An apparatus for determining a position of a mobile object, comprising:

means provided at each of a plurality of spaced positions for receiving a radio wave of a constant frequency transmitted from the mobile object and detecting a frequency of the radio wave;

means for generating a plurality of Doppler shift signals observed at the respective spaced positions, each Doppler shift signal being indicative of a Doppler shift value dependent on a movement of the mobile object, on the basis of frequencies of the received radio wave detected at the respective positions;

means for selecting at least two Doppler shift signals which satisfy predetermined two different conditions among the plurality of Doppler shift signals;

means for determining the position of the mobile object from position data indicating the positions corresponding to the selected Doppler shift signals; and wherein the selected Doppler shift signals comprise a first Doppler shift signal which provides a maximum value of upward Doppler shift values, a second Doppler shift signal which provides a maximum value of downward Doppler shift values and third and fourth Doppler shift signals which provide substantially equal upward and downward shift values, respectively.

8. A method according to claim 7 wherein the position of said mobile object is determined by a point where a first straight line and a second straight line intersect, the first straight line connecting a first position corresponding to the first Doppler shift signal and a second position corresponding to the second Doppler shift signal, and the second straight line connecting a third position corresponding to the third Doppler shift signal and a fourth position corresponding to the fourth Doppler shift signal.

9. A mobile communication system comprising:

a plurality of base stations distributed within a region where a mobile object is movable for radio communication with the mobile object;

frequency detecting means provided in each of the base stations for detecting a predetermined frequency of a radio wave transmitted from the mobile object and received at the base station;

mobile object detecting means for detecting a position of the mobile object on the basis of the respective positions of said base stations and frequency differences between the detected frequencies detected by said frequency detecting means provided in the respective base stations and the predetermined frequency of the radio wave transmitted from the mobile object; and wherein said mobile object detecting means comprises means for determining the position of said mobile object as a point where a first straight line and a second straight line intersect with each other, the first straight line passing through at least one of the base stations which detects a substantially maximum upward Doppler shift value or its vicinity and at least one of the base stations which detects a substantially maximum downward Doppler shift value or its vicinity, the second straight line intersecting with the first straight line substantially at a right angle and passing through at least one of the base stations which detects a substantially zero or minimum Doppler shift value or its vicinity.

10. A mobile communication system comprising:

a plurality of base stations distributed within a region where a mobile object is movable for radio communication with the mobile object;

frequency detecting means provided in each of the base stations for detecting a predetermined frequency of a radio wave transmitted from the mobile object and received at the base station;

mobile object detecting means for detecting a position of the mobile object on the basis of the respective positions of said base stations and frequency differences between the detected frequencies detected by said frequency detecting means provided in the respective base stations and the predetermined frequency of the radio wave transmitted from the mobile object; and wherein said mobile object detecting means comprises means for determining the position of said mobile object as a point where a first straight line and a second straight line intersect with each other, the first straight line passing through at least one of the base stations which detects a substantially maximum upward Doppler shift value or its vicinity and at least one of the base stations which detects a substantially maximum downward Doppler shift value or its vicinity, the second straight line passing through at least two of the base stations which detect substantially equal up and down Doppler shift values or their vicinities.

11. An apparatus for determining a position of a mobile object, comprising:

a plurality of radio stations disposed in a region where a mobile object which transmits a radio wave, is movable to make radio communication with the mobile object;

frequency detecting means provided in each of said radio stations for detecting a predetermined frequency of a radio wave transmitted from the mobile object and received at the radio station;

mobile object detecting means for detecting the position of the mobile object on the basis of respective positions of said radio stations and frequency differences between the detected frequencies detected by said frequency detecting means of the respective radio stations and the predetermined frequency of the radio wave transmitted from the mobile object; and wherein said mobile object detecting means comprises means for determining the position of the mobile object as a point where a first straight line and a second straight line intersect with each other, the first straight line passing through at least one of the radio stations which detects a substantially maximum upward Doppler shift value or its vicinity and at least one of the radio stations which detects a substantially maximum downward Doppler shift value or its vicinity, the second straight line intersecting with the first straight line substantially at a right angle and passing through at least one of the radio stations which detects a substantially zero or minimum Doppler shift value or its vicinity.

12. An apparatus for determining a position of a mobile object, comprising:

a plurality of radio stations disposed in a region where a mobile object which transmits a radio wave, is movable to make radio communication with the mobile object;

frequency detecting means provided in each of said radio stations for detecting a predetermined frequency of the radio wave transmitted from the mobile object and received at the radio station;

mobile object detecting means for detecting the position of the mobile object on the basis of respective positions of said radio stations and frequency differences between the detected frequencies detected by said frequency detecting means of the respective radio stations and the predetermined frequency of the radio wave transmitted from the mobile object; and wherein said mobile object detecting means comprises means for determining the position of the mobile object as a point where a first straight line and a second straight line intersect with each other, the first straight line passing through at least one of the radio stations which detects a substantially maximum upward Doppler shift values or its vicinity and at least one of the radio stations which detects a substantially maximum downward Doppler shift value or its vicinity, the second straight line passing through at least two of the radio stations which obtained the detected values including substantially equal up and down shift values or their vicinities.

13. An apparatus for determining a position of a mobile object, comprising:

a plurality of spaced receiving means disposed in a space where a mobile object which transmits a radio wave signal of a given frequency is movable for receiving the radio wave signal from the mobile object;

frequency deviation measuring means for measuring a frequency deviation in the radio wave signal received by each of said plurality of receiving means;

position detecting means for detecting the position of the mobile object on the basis of the frequency deviation associated with each of said plurality of receiving means and the respective positions of said receiving means; and wherein said position detecting means comprises means for determining the position of the mobile object as a point where a first straight line and a second straight line intersect with each other, the first straight line passing through at least one of the receiving means which detects a substantially maximum upward Doppler shift value or its vicinity and at least one of the receiving means which detects a substantially maximum downward Doppler shift value or its vicinity, the second straight line intersecting with the first straight line substantially at a right angle and passing through at least one of the receiving means which detects a substantially zero or minimum Doppler shift value or a vicinity.

14. An apparatus for determining a position of a mobile object, comprising:

a plurality of spaced receiving means disposed in a space where a mobile object which transmits a radio wave signal of a given frequency is movable for receiving the radio wave signal from the mobile object;

frequency deviation measuring means for measuring a frequency deviation in the radio wave signal received by each of said plurality of receiving means;

position detecting means for detecting the position of the mobile object on the basis of the frequency deviation associated with each of said plurality of receiving means and the respective positions of said receiving means; and wherein said position detecting means comprises means for determining the position of the mobile object as a point where a first straight line and a second straight line intersect with each other, the first straight line passing through at least one of the receiving means which detects a substantially maximum upward Doppler shift value or its vicinity and at least one of the receiving means which detects a substantially maximum downward Doppler shift value or its vicinity, the second straight line passing through at least two of the receiving means which detect substantially equal up and down Doppler shift values or their vicinities.

15. A method of determining a current position of a mobile object which has moved from a known position, said method comprising the steps of:

transmitting a radio wave of a constant frequency from the mobile object;

receiving the radio wave transmitted from said mobile object and detecting a frequency of the received radio wave at each of a plurality of spaced fixed positions in an area where said mobile object is movable;

determining a plurality of Doppler shift signals observed at the respective fixed positions, each Doppler shift signal being indicative of a Doppler shift value dependent on a movement of the mobile object, on the basis of frequencies of the received radio wave detected at the fixed positions, respectively;

selecting at least two of said Doppler shift signals which satisfy a predetermined condition among the plurality of Doppler shift signals;

determining the current position of said mobile object on the basis of position data indicating the fixed positions corresponding to said selected at least two Doppler signals; and wherein said selected at least two Doppler signals include maximum and minimum Doppler shift signals which provide maximum and minimum Doppler shift values, respectively, among upward or downward Doppler shift values given by said plurality of Doppler shift signals.

16. A method according to claim 15, wherein the current position of said mobile object is determined by a position where first and second straight lines intersect with each other, wherein said first straight line passes a first one of the fixed positions corresponding to said maximum Doppler shift signal and extending toward said known position, while said second straight line passes a second one of the fixed positions corresponding to said minimum Doppler shift signal to extend toward said known position and intersects at a right angle with said first straight line.

* * * * *